United States Patent [19]

Miller

[11] Patent Number: 4,608,739

[45] Date of Patent: Sep. 2, 1986

[54] CONNECTOR OF AND SEALING OF TUBULAR MEMBERS

[75] Inventor: Jack E. Miller, Houston, Tex.

[73] Assignee: Big-Inch Marine Systems, Inc., Houston, Tex.

[21] Appl. No.: 590,628

[22] Filed: Mar. 21, 1984

Related U.S. Application Data

[63] Continuation-in-part of Ser. No. 482,525, Apr. 6, 1983, abandoned.

[51] Int. Cl.⁴ .................. B23P 17/00; B21D 39/08
[52] U.S. Cl. ..................................... 29/421 R; 72/58
[58] Field of Search ............... 29/421 R, 446, 507, 29/523; 72/54, 56, 57, 58

[56] References Cited

U.S. PATENT DOCUMENTS

| | | |
|---|---|---|
| 2,460,580 | 2/1949 | Huber . |
| 3,977,068 | 8/1976 | Krips . |
| 4,006,619 | 2/1977 | Anderson . |
| 4,069,573 | 1/1978 | Rogers, Jr. et al. . |
| 4,125,937 | 11/1978 | Brown et al. . |
| 4,332,073 | 6/1982 | Yoshida et al. . |
| 4,359,889 | 11/1982 | Kelly . |
| 4,368,571 | 1/1983 | Copper, Jr. . |
| 4,387,507 | 6/1983 | Kelly . |
| 4,388,752 | 6/1983 | Vinciguerra et al. . |
| 4,418,457 | 12/1983 | Mueller . |
| 4,418,556 | 12/1983 | Galle et al. . |
| 4,420,867 | 12/1983 | Busse . |

OTHER PUBLICATIONS

ENI's Priorities: Deepwater and Pipelaying, Offshore Engineer, Mar. 1983, pp. 41–42.
'Safety-Gripper' advertisement of Oil States Rubber Co.

Primary Examiner—Mark Rosenbaum
Assistant Examiner—Steven Nichols
Attorney, Agent, or Firm—Arnold, White & Durkee

[57] ABSTRACT

A method of forming a connection between a tubular member and an annular collar which has at least one internal annular recess. The method includes positioning the collar over portion of the tubular member to define an axially extending connection zone embracing the annular recess, positioning a solid deformable transmitting material in the tubular member in alignment with the connection zone, confining the transmitting material axially to the connection zone, and applying a deformation force gradually to the transmitting material to deform its radially outwardly and thus deform the tubular member into the recess of the collar to form a connection.

27 Claims, 32 Drawing Figures

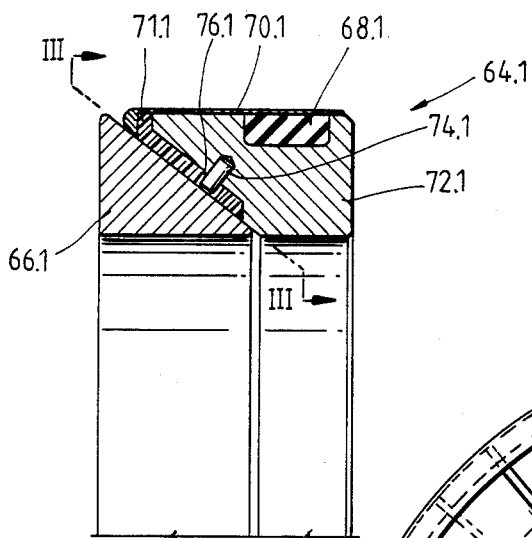
_Fig. 2_
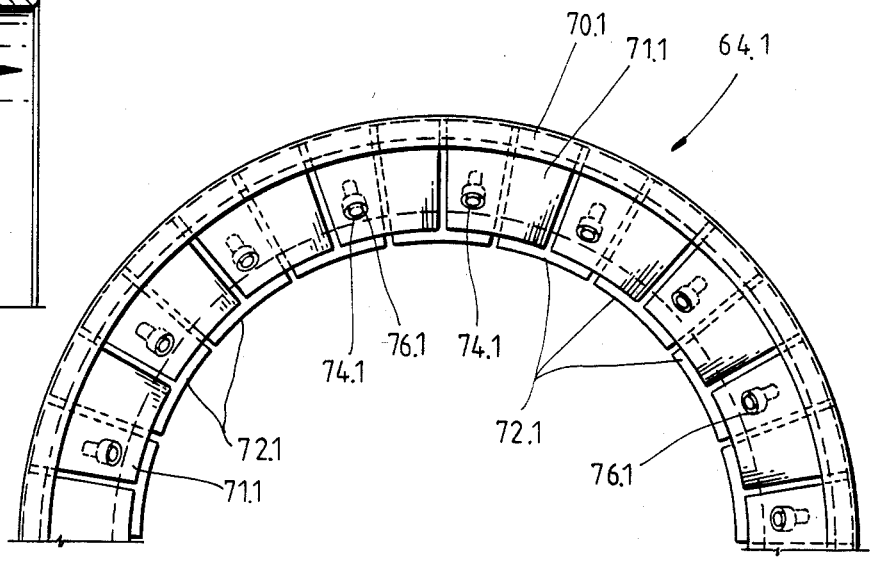
_Fig. 3_
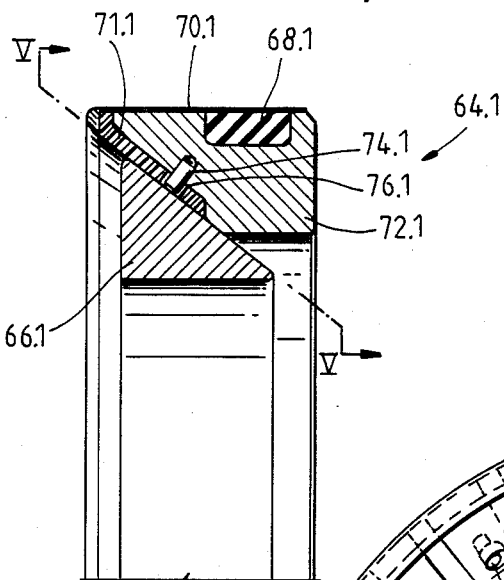
_Fig. 4_
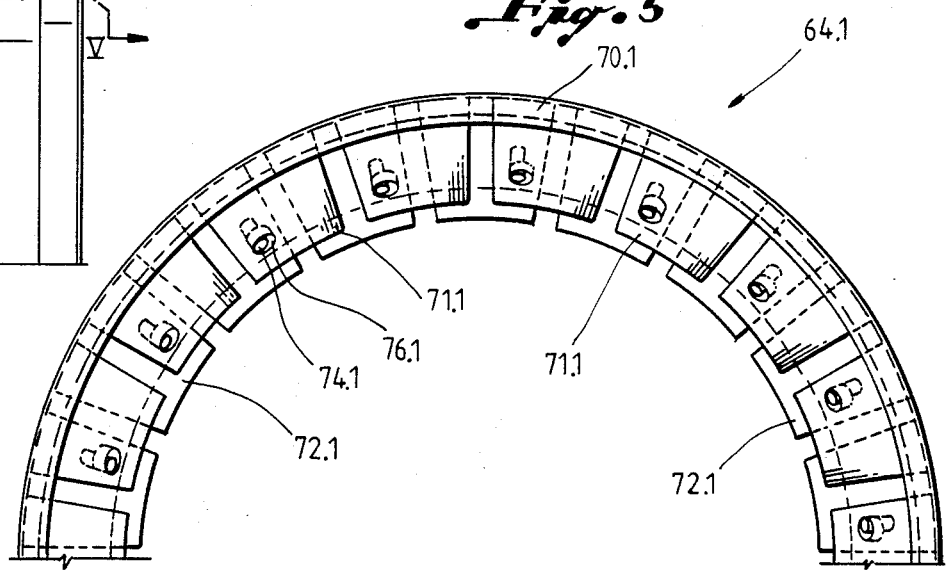
_Fig. 5_

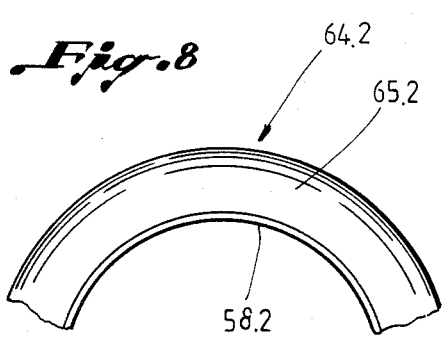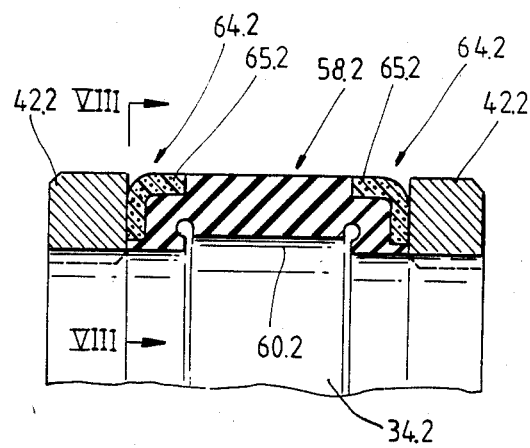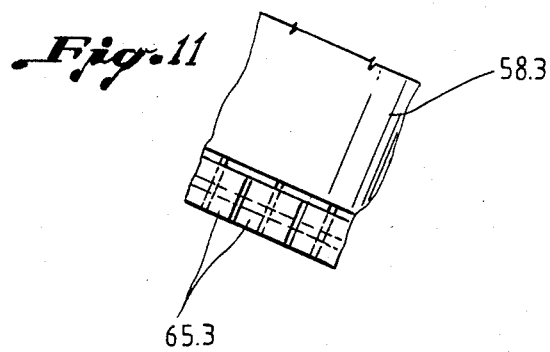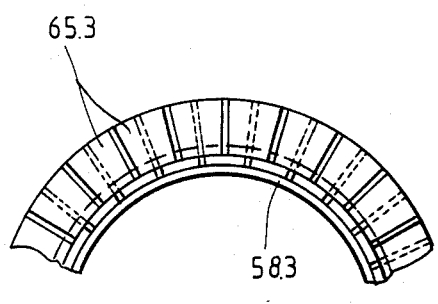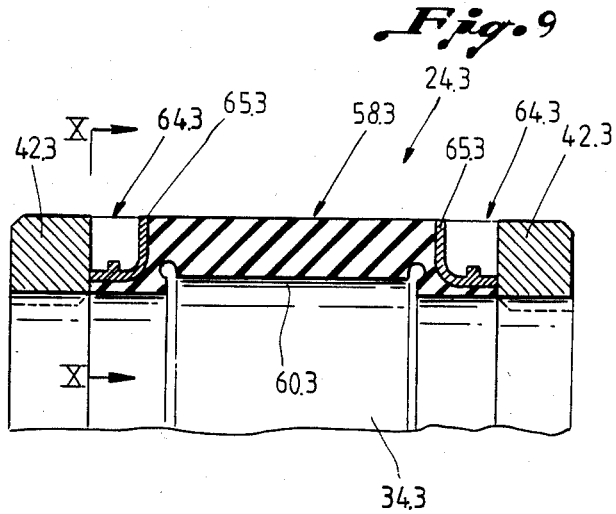

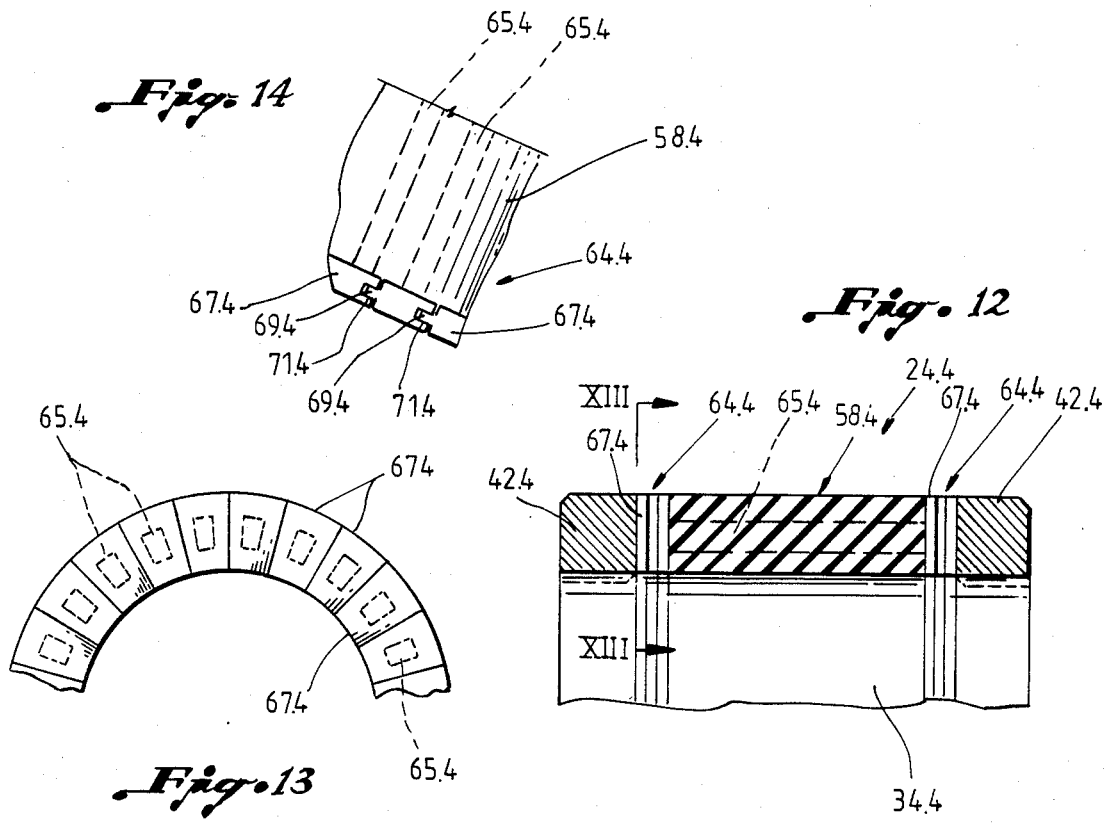
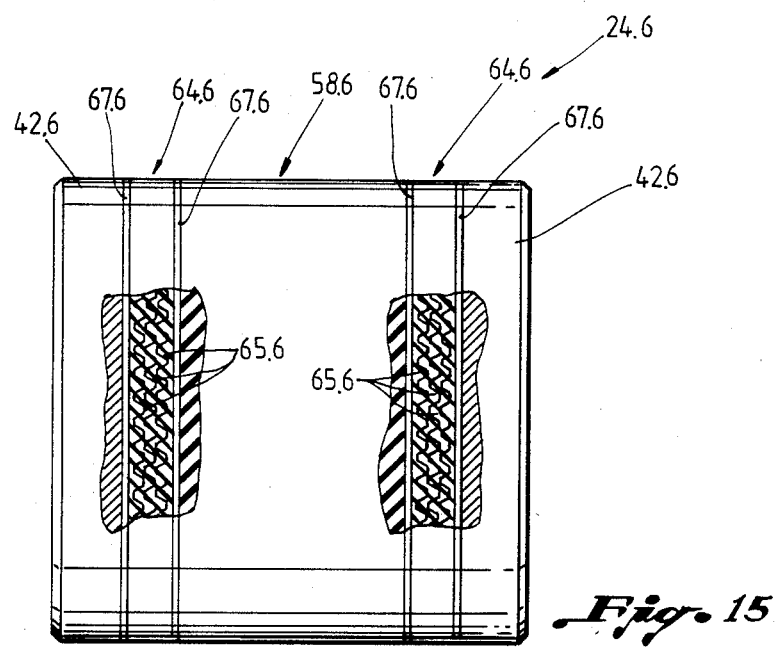

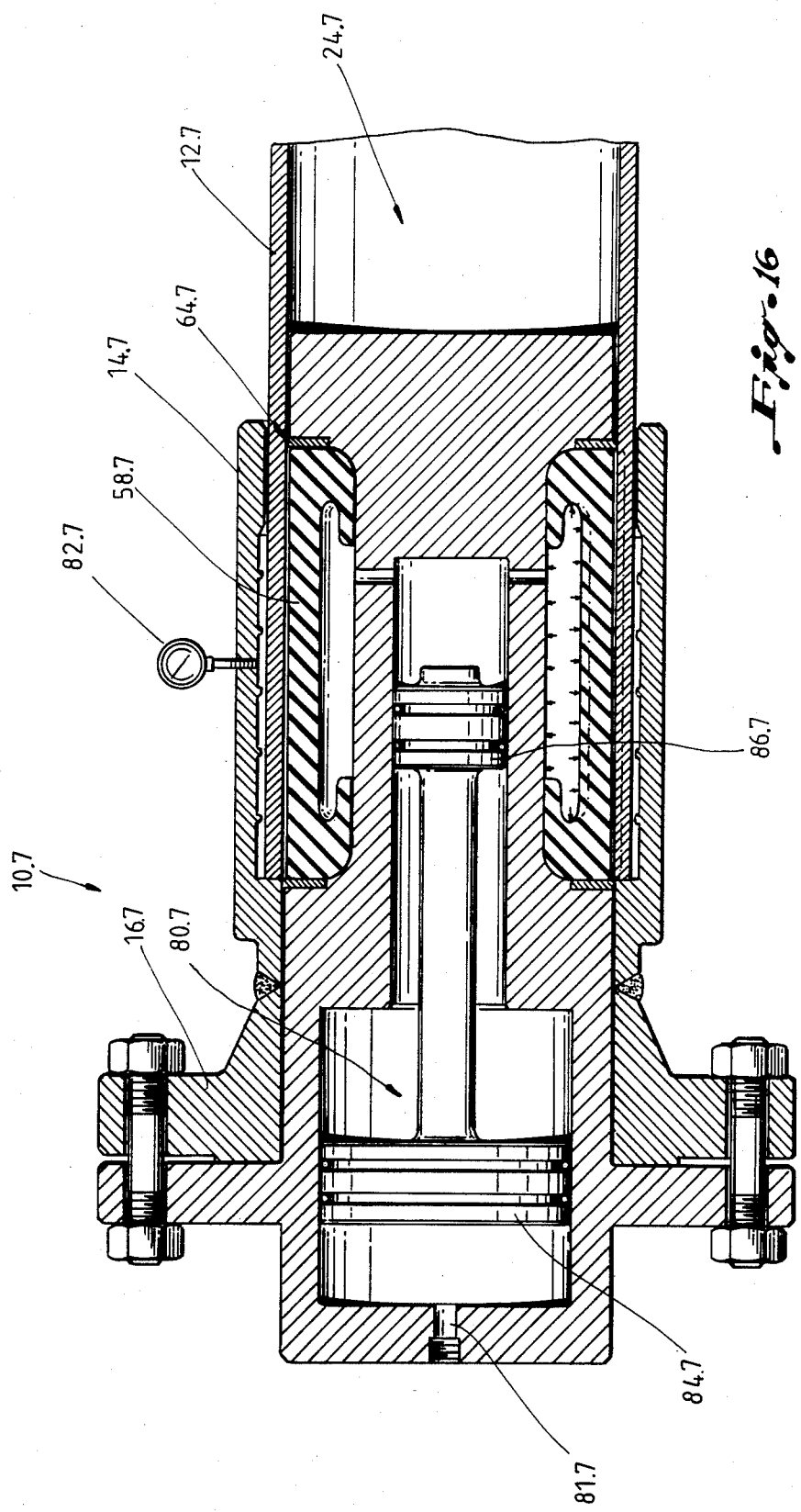

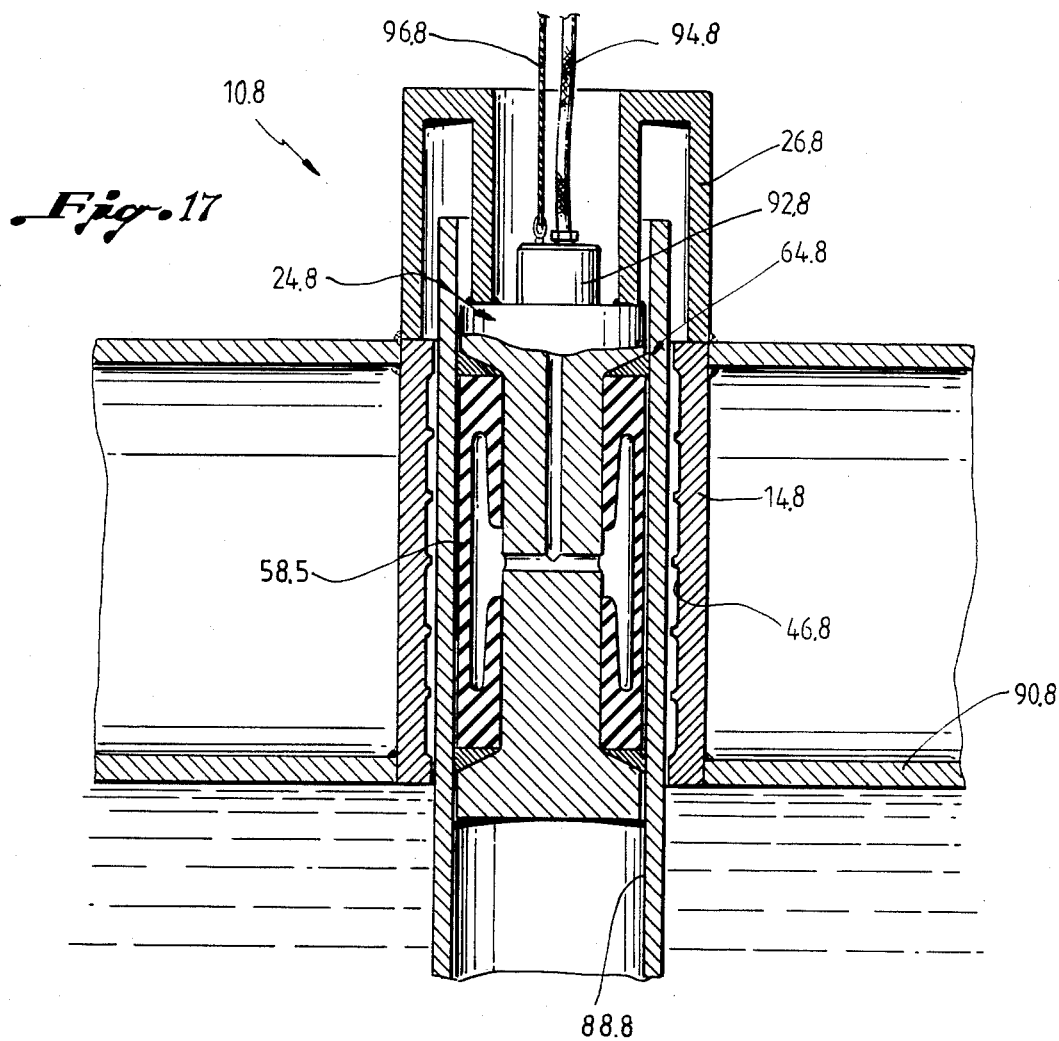
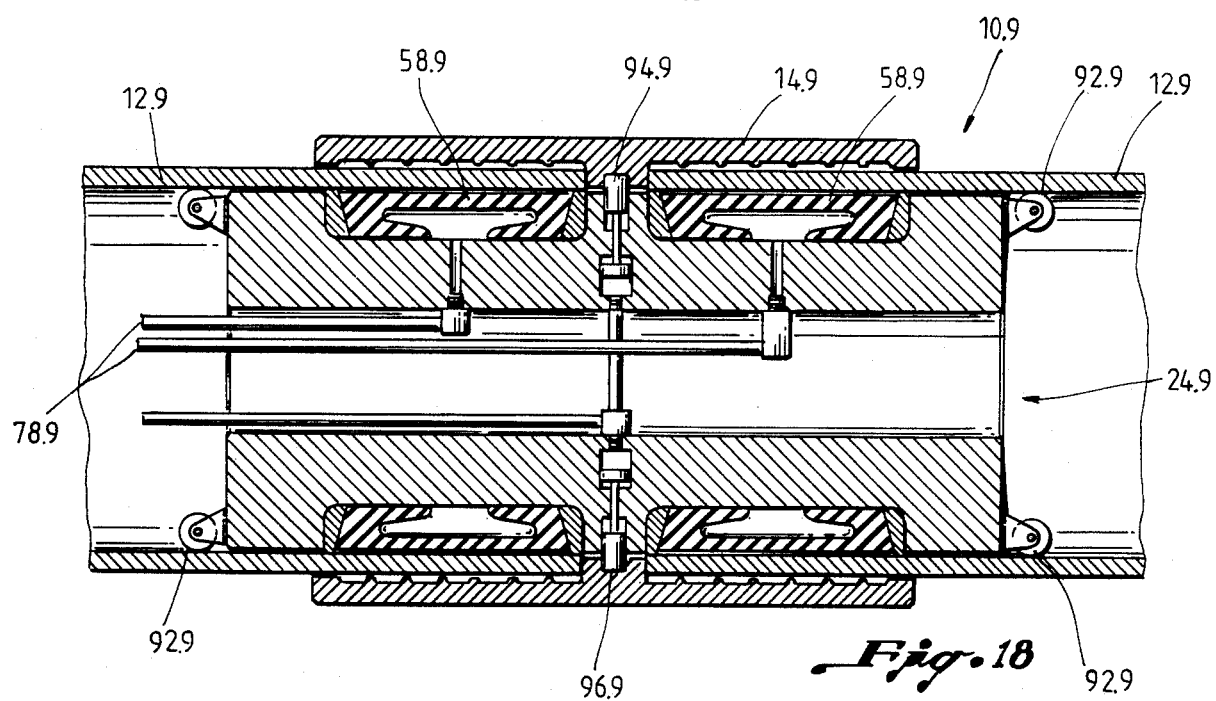

CONNECTOR OF AND SEALING OF TUBULAR MEMBERS

This application is a continuation-in-part application of my co-pending patent application Ser. No. 482,525 filed Apr. 6, 1983 now abandoned.

This invention relates to the connection of and to the sealing of tubular members. In particular, this invention relates to a method of and apparatus for use in forming a connection between tubular members, and to a method and apparatus for forming a seal in tubular members.

While one aspect of the invention may have application in regard to the connection of various types of tubular members, it can have particular application in regard to the formation of subsea pipeline systems and in the connection of piles to pile bases or to pile jackets for offshore construction.

Subsea pipeline connections are generally much more difficult to perform than connections on land and than connections between perfectly machined tubular members. Subsea pipeline connections are difficult to perform because such connections must retain high pressures; they must have the structural strength of the subsea pipe itself; the pipe surface is generally rough; the pipe is generally dimensionally inconsistent through manufacturing inconsistencies and/or through handling; the water atmosphere precludes the use of welding except in an evacuated chamber; the environment is hostile; and permanent protrusions into the pipe bore are unacceptable.

The most limiting features of the difficulties in performing subsea connections, are the surface quality of the raw pipe and its dimensional inconsistencies. The surface quality becomes even more critical when a connection must be made to an existing pipeline. Pitting, scouring and other corrosion of the pipe surface can make effective sealing extremely difficult.

One of the most commonly used methods for effecting subsea mechanical pipeline connections, is a method in which a mechanical connection flange is secured to a pipeline by a mechanical gripping action. Sealing on the rough unprepared geometry of the pipe is handled by means of some highly deformable material such as an elastomer.

Another method used for effecting a mechanical connection of a subsea pipeline, is a method in which pipe metal is deformed into a receiving sleeve member either by means of a high energy force such as an explosion or by mechanically cold forging the metal incrementally until the metal of the pipe is intimately mated with the metal of the sleeve member through metal to metal contact therewith.

An explosive charge is dangerous to handle, is limited to predictability, requires dewatering of the pipeline, and may induce significant metallurgical changes in the exposed metal due to the rapid rate at which energy is applied. The stress which will result in a pipe being deformed is a function of the strain imposed thereon, and the rate at which the strain is imposed. Metal will therefore resist a high rate deformation force to a much greater degree than a low rate deformation force.

Mechanical cold forging by means of rotatably driven rollers generally induces a large plastic deformations on the inside pipe surface. This in turn induces increases in metal hardness which could possibly induce a greater susceptibility to corrosion. Cold forging by means of rollers also creates strain level differentials between the metal in contact with a roller during use, and the metal which is not in contact with a roller during use. Mechanical cold forging systems usually require bulky and complex tools to effect forging in an effective manner.

A system has been suggested for expanding a section of a pipe radially by sealing off that section and then applying a high pressure fluid directly to the internal surface of that section. While this sounds possible in theory, in practice it is extremely difficult to provide an effective seal which will allow deformation at a relatively low rate, but to a sufficient extent to form an effective pressure tight seal. Unless extremely effective and thus expensive and complicated sealing systems are utilized, only a mechanical connection in the axial sense would be expected. Where the operation is performed on a subsea pipeline system where corrosion has occurred, it is expected that it would be impossible to achieve a sufficient seal to allow effective deformation of a pipe section for forming any form of realistic connection other than possibly a nominal upset connection.

Another system which has been suggested for expanding a pipe section, is to provide a mechanical axial compressive force to axially compress a rubber sleeve and thereby cause radial expansion thereof sufficient to expand the pipe section in which it is positioned. This system of providing mechanical means to axially compress a rigid rubber sleeve for achieving the required radial expansion of the sleeve, is a clumsy and bulky method of creating the required pressure. A hydraulic cylinder capable of creating a sufficient axial compressive load will conceivably weigh several tons and will require a bore diameter approximately three times the diameter of the pipe to be connected. This can present a handling problem. It can also mean that this type of system can only be used on a pipe end which is accessible, and cannot be operated in a remote pipe location such as in a pile connection where the connection is made in a zone remote from the open end of the pipe. Furthermore, axial compression of a rigid rubber sleeve requires a significant compressive force to overcome the resistance to axial compression of the sleeve itself. This creates significant losses in addition to the frictional losses which are inevitable. It therefore becomes increasingly difficult to detect the degree of load which has been applied in the radial direction.

It is accordingly one of the objects of this invention to provide a method of and an apparatus for use in forming connections between tubular members which can overcome or at least partially reduce the disadvantages of the prior art systems.

Most high pressure systems which rely upon resiliently deformable materials such as rubber to provide seals, suffer from the disadvantage that the material of the seal can tend to extrude axially away from the high pressure zone. This problem can be minimized in the case of standing seals since metal to metal sealing can be employed. This is particularly a problem in the case of moving seal and in the case of seals which are not utilized as permanent seals.

It is one of the objects of this invention to provide a method and apparatus for restricting the deformation or extrusion of deformable material under pressure, and for the effective application thereof.

In accordance with one aspect of the invention there is provided an apparatus for use in forming a connection between an inner tubular member and an outer tubular member when they are axially overlapped to form an axially extending connection zone, the apparatus comprising a connection tool to be positioned to axially embrace the connection zone, the connection tool comprising:

(a) a mandrel;
(b) axially spaced confining means to define an axially confined zone of the mandrel for registering with the connection zone;
(c) a force transmitting sleeve of a solid deformable material positioned in the confined zone, the sleeve being positioned on the mandrel to define an internal recess for receiving a fluid under pressure;
(d) anti-extrusion means which is associated with the sleeve to be displaceable in a radial direction during use into abutment with the adjacent tubular member to limit extrusion of the transmitting material in an axial direction during use; and
(e) force direction means for directing a force in the form of a fluid under pressure gradually to the internal recess during use to cause deformation of the sleeve in a radial direction for engaging with and then causing deformation of the walls of one adjacent tubular member in a radial direction for engaging with the walls of the other tubular member in the connection zone to form a connection between the first and second tubular members.

The material of the force transmitting sleeve may be any material which can conveniently be confined sufficiently in the confined zone during application of the deformation force to allow effective deformation of the sleeve in a radial direction.

If the material is not sufficiently viscous, or is too compressible, or is too extrudable, or lacks sufficient cohesiveness at tensile strength, the material will tend to become displaced or extruded in an axial direction beyond the confining means. The deformation force in the radial direction will thus be reduced or will be dissipated and/or the material will lose its integrity and will become damaged.

The transmitting material should preferably be a material which is relatively or substantially incompressible, and which is preferably resiliently deformable to facilitate the recovery after use.

The material is preferably elastically deformable rather than plastically deformable, but may be plastically deformable if it has sufficient coherence to resist undue extrusion in an axial direction.

In a presently preferred embodiment of the invention, the material comprises a rubber which is incompressible, which has a relatively low resistance to deformation, but which has a relatively high resistance to tearing and failure. Typical rubber compositions which applicant believes may be used, include rubber compositions of the types used in making packings for oil field applications, including nitrile rubber, "HYCAR" rubber and natural rubber.

Synthetic plastics materials having similar properties should also be suitable.

Rubbers or synthetic plastics materials having reinforcing including metal or fiber reinforcing to improve tear and failure resistance and to increase resistance to extrusion should also be suitable for use in this invention.

A coherent mass of rubber or of synthetic plastics material, which is resiliently deformable with a relatively low resistance to deformation and a relatively high resistance to tearing, should be able to be confined in such a confined zone, and should be able to be restrained against undue displacement or extrusion in an axial direction out of the connection zone even if a tubular member is being worked upon which is dimensionally inaccurate or out of round and/or which has a scoured or corroded surface.

An appropriate rubber provides the properties that it is highly deformable under a net loading, is incompressible when trapped in all directions, is relatively easy to seal, will return to nearly its original shape after deformation, will not concentrate loads and stresses, and will easily conform to non-uniform shapes.

Such a suitable material can be deformed gradually to achieve gradual deformation of the connection zone of such a tubular member thereby limiting the stress imposed on the metal of the tubular member and limiting the extent to which metallurgical changes occur. Because a deformation force can be applied gradually, deformation can be accurately controlled and can be accurately stopped at an appropriate time.

In a preferred embodiment of the invention the material may be a coherent mass of resiliently deformable material in the form of an annular sleeve which is mounted on the mandrel.

The connection tool of this invention may be positioned over a pair of axially overlapped tubular members for the purpose of deforming the walls of the outer tubular member radially inwardly into engagement with the walls of the inner tubular member. Alternatively, the connection tool of this invention may be adapted to be positioned within the inner tubular member when the tubular members are overlapped, with the force transmitting sleeve being adapted to be deformed in a radial outward direction to engage with the inner surface of the walls of the inner tubular member and then deform these walls radially outwardly into engagement with the walls of the outer tubular member.

In one embodiment of the invention the anti-extrusion means may comprise reinforcing means in the transmitting material. It may therefore be in the form of metal reinforcing rods or wires, fiber or other reinforcing incorporated or embedded in the transmitting material.

In a preferred embodiment of the invention the anti-extrusion means may be such that it is adapted to cooperate with the inner walls of such a tubular member during use to inhibit extrusion in an axial direction.

In an example of this embodiment of the invention, the anti-extrusion means may comprise wedge means to be wedged against the inner walls of such a tubular member during use.

In an alternative example of this embodiment of the invention, the anti-extrusion means may comprise rigid anti-extrusion members provided along the outer axial peripheries of the transmitting material.

In this example of the invention the anti-extrusion members may be in the form of radially displaceable segmented members arranged in annular bands along the outer axial peripheries of the transmitting material.

In a presently preferred embodiment of the invention, the anti-extrusion means may comprise an anti-extrusion member provided at each axial end of the sleeve, each anti-extrusion member comprising a helical member which is axially located relatively to the mandrel, and displacement means which is associated with the helical member to transmit pressure from the sleeve to the helical member to cause radial outward displacement of the helical member into abutment with the inner surface of the inner tubular member to close the annular gap and thus restrict axial extrusion of the sleeve past the helical member.

The displacement means may preferably comprise a deformable material which is deformable under pressure. It may, however, be in the form of an annular wedge member or the like.

The helical member preferably comprises a plurality of coils which have a dimension and strength to resist deformation in the axial direction under load, but which can be deformed sufficiently in the radial direction to close the gap before the material of the sleeve or the material of the displacement means can commence to extrude through between the helical member and the adjacent inner wall of the tubular member.

The coils of the helical member may conveniently be of substantially rectangular or square cross section to provide surface contact between adjacent coils during axial compression, and to provide surface contact between the coils of the helical member and the proximate wall of the tubular member during radial abutment therewith.

The force direction means may conveniently comprise a pressure chamber or bore which is provided within the mandrel for connection to a source of fluid under pressure, to apply such a pressurized fluid to the internal recess formed between the mandrel and the force transmitting sleeve.

The pressure chamber is preferably arranged so that the pressurized fluid will be directed largely in a radial outward direction for deformation of the transmitting material in a radial direction. This will tend to reduce energy losses which would otherwise arise if the transmitting material is to be displaced in an axial direction before deformation in a radial direction occurs. It will further tend to improve the predictability since axial displacement of a transmitting material in a tubular member will provide a resistance to displacement which depends upon the transmitting material, upon the condition of the proximate wall of the tubular member, upon the distance of axial displacement, and upon lubrication.

The apparatus may include force generating means for generating a fluid under pressure. The force generating means may be of any conventional type which can provide the requisite pressure and will be capable of operation in the environment where the connection is to be formed. In an embodiment of the invention the force generating means may comprise a high pressure of intensifier pump system.

In a presently preferred embodiment of the invention, the force transmitting sleeve may be formed with an internal annular recess bounded by inwardly directed annular zones which are designed to be forced onto the mandrel into sealing engagement therewith when a fluid under pressure is applied to the internal annular recess, to further provide resistance to fluid leakage out of the internal annular recess during use.

The apparatus preferably includes an annular collar to be positioned over such a tubular member for connection thereto, the annular collar having an annular recess along its internal surface for receiving the walls of such a tubular member when expanded by means of the apparatus.

The annular collar preferably has at least one relief port, and preferably a plurality of circumferentially spaced relief ports, for the release of fluid from the annular recess during the forming operations.

In an embodiment of the invention, the annular collar has a connection flange and the connection tool has a complementary connection flange for removably connecting the connection tool to the annular collar during use of the apparatus.

The annular collar may have at least one internal annular tooth to be embedded in the outer surface of the walls of such a tubular member when it is expanded to provide for an increased axial location force between the annular collar and the tubular member.

In accordance with a further aspect of the invention, there is provided apparatus for use in restricting extrusion of a deformable material under pressure through an annular gap defined between inner and outer annular surfaces, the apparatus comprising a helical member to be positioned proximate the annular gap in axial location with one of the two annular surfaces, and displacement means associated with the helical member to transmit pressure from such a deformable material to the helical member to cause radial displacement of the helical member into abutment with the other of the two surfaces to close the annular gap.

This apparatus may be used whether the helical member is located axially relatively to the inner annular surface or relatively to the outer annular surface. In either event, the displacement means is designed to act on the helical member to cause radial displacement of the helical member either in the radial inward or radial outward direction through an action which will either tend to shorten the helical member in the case of radial expansion, or will tend to elongate the helical member in the case of radial compression.

The displacement means may, for example, comprise an annular wedge member which is adapted to be displaced to cause radial displacement of the helical member. In an alternative example of the invention, the displacement means may comprise a deformable material which is deformable under pressure to cause radial displacement of the helical member.

In an embodiment of the invention, the displacement means may be integral with the deformable material which is to be contained against axial extrusion.

In embodiments of the invention, the helical member may comprise a plurality of coils and at least one of the inner and outer annular surfaces of the helical member may be tapered relatively to its axis to vary not only the positioning of the successive coils in the radial direction, but also the resistance to radial displacement of successive coils. This may also be achieved by successive coils having differing radial thickness to provide differing resistances to radial displacement.

In accordance with yet a further aspect of the invention, there is provided apparatus for informing an annular seal in a tubular member, the apparatus comprising a mandrel to be inserted into such a tubular member, a sealing sleeve of deformable material located on the mandrel, the sealing sleeve being adapted to be expanded into sealing engagement with the inner surface of such a tubular member during use, and at least one anti-extrusion member for restricting axial extrusion of at least one axial end of the sleeve through an annular gap between the mandrel and such a tubular member during use, the anti-extrusion member comprising a helical member which is axially located relatively to the mandrel, and displacement means for transmitting a force from the sealing sleeve when it is expanded to the helical member to cause radial displacement of the helical member into abutment with the inner surface of the tubular member to close the gap and restrict axial extrusion of the sealing sleeve.

The apparatus of this aspect of the invention can have various applications in various fields. It can, however, have particular application in moving or nonpermanent seals where a resilient sealing material is employed and which is therefore, under high pressures of say 10,000 psi or more, subject to axial extrusion tendencies which can cause failure or fatigue, and which can lead to lack of reusability of such sealing materials.

In one application of the invention, the apparatus may for example be in the form of a downhole packer for forming an annular seal in a tubular member in the form of a downhole casing or the like, the packer including expansion means for radially expanding the sealing sleeve into engagement with the walls of such downhole casing during use, and including an anti-extrusion member positioned proximate at least one and preferably proximate each axial end of the sealing sleeve to restrict axial extrusion thereof.

The packer may be of any conventional type and may be a permanent or temporary packer.

In an alternative embodiment of the invention, the apparatus may be in the form of a high pressure piston device for forming an annular seal in a tubular member in the form of a cylinder. In this embodiment of the invention the mandrel may comprise the piston of the piston device, with the sealing sleeve being shaped to be expanded by pressure within such a cylinder during use to form a seal with the walls of such a cylinder, and with the anti-extrusion member being positioned to restrict extrusion or deformation of the sleeve into an annular gap between the piston and such a cylinder during use.

In yet a further alternative example of this embodiment of the invention, the apparatus may be in the form of a pressure isolated device for producing high pressure in an axially isolated zone in a tubular member. In this embodiment of the invention the mandrel will have two axially spaced sealing sleeves to define an axially isolated zone between them during use, with each sealing sleeve having an anti-extrusion member positioned proximate its end which is remote from the other sealing sleeve, and with the device including a bore for directing a high pressure fluid to the isolated zone during use, and with the device having expansion means for use in radially expanding the sleeves during use to form such axially spaced seals.

This embodiment of the invention may have application as a hydrostatic testing device for testing a pipe joint, or for determining the bursting strength of a tubular member or pipe.

The invention further extends to a method of restricting the deformation or extrusion of a deformable material through an annular gap defined between inner and outer annular surfaces, which comprises locating a helical member axially relatively to one of the two annular surfaces proximate the gap, and associating the helical member with the deformable material for deformation of the deformable material under pressure to cause radial displacement of the helical member into abutment with the other of the two surfaces to close the gap.

In making connections between tubular members in accordance with this invention, conventional engineering principles will be employed to achieve the most effective sealing engagement between the tubular members. Thus, as is conventional, the deformation force will be applied to elastically and then plastically expand the inner tubular member, and to elastically expand the collar or outer tubular member in the connection zone. Thereafter the deformation force is released before plastic deformation of the outer tubular member or collar can occur, for elastic recovery of the collar to provide a residual interface sealing pressure between the collar the the tubular member.

After elastic deformation of the collar or outer tubular member, the collar will attempt to recover in an amount proportional to its tensile yield strength. Likewise the inner tubular member will attempt to recover in an amount proportional to its tensile yield strength.

The collar is therefore selected so that the tensile yield strength of the collar is greater than that of the tubular member, and is conveniently between about one and one-half and about three and one-half or more times greater than that of the tubular member to provide an effective interference fit.

In a preferred application, the collar would conventionally be selected so that it has a tensile yield strength which is about twice and preferably between about two and about three times that of the tubular member and so that the outer to inner diameter ratio of the collar is generally or substantially equal to that of the tubular member.

If the outer to inner diameter ratio of the collar is much less than that of the tubular member, the collar cannot provide the optimum residual pressure unless the ratio of tensile yield strength of the collar to tubular member is greater than 3:1.

The optimum residual pressure is the maximum pressure which could be applied to the tubular member before collapsing it.

In practice, therefore, the ratio of tensile yield strength can be balanced against the ratio of the wall thicknesses to provide the optimum residual pressure for any particular application.

Embodiments of the invention are now described by way of example with reference to the accompanying drawings.

In the drawings:

FIG. 2 shows a fragmentary, cross-sectional view of the apparatus of FIG. 1 to an enlarged scale to show detail of the anti-extrusion means of the apparatus in its rest or initial position;

FIG. 3 shows a fragmentary sectional view of the anti-extrusion means of FIG. 2 along the line III—III of FIG. 2;

FIG. 4 shows a fragmentary cross-sectional view of the apparatus of FIG. 1 to an enlarged scale to show detail of the anti-extrusion means of the apparatus in its operative radially displaced position;

FIG. 5 shows a fragmentary view of the anti-extrusion means of FIG. 4 along the line V—V of FIG. 4;

FIG. 7 shows a fragmentary cross-sectional view of an alternative embodiment of the connection apparatus of this invention to demonstrate an alternative form of anti-extrusion means;

FIG. 8 shows a fragmentary view of the apparatus of FIG. 7 along the line VIII—VIII of FIG. 7;

FIG. 9 shows a fragmentary, cross-sectional view of yet a further alternative embodiment of the connection apparatus of this invention to demonstrate yet a further alternative form of anti-extrusion means;

FIG. 10 shows a cross-sectional view along line X—X of FIG. 9, whereas FIG. 11 shows a fragmentary top view of the anti-extrusion means of the apparatus of FIG. 9;

FIG. 12 shows a fragmentary, cross-sectional view of an alternative embodiment of the connection apparatus of this invention to demonstrate yet a further alternative form of anti-extrusion means;

FIG. 13 shows a fragmentary sectional view along line XIII—XIII of FIG. 12, whereas FIG. 14 shows a fragmentary top view of the anti-extrusion means of FIG. 12;

FIG. 15 shows a fragmentary partly cross-sectional view of an alternative embodiment of the connection apparatus of this invention to demonstrate yet a further alternative form of anti-extrusion means;

FIG. 16 shows a diagramatic, cross-sectional view of an alternative embodiment of connection apparatus in accordance with this invention, which incorporates a pressure intensifier for generating the deformation force;

FIG. 17 shows a cross-sectional view of an alternative embodiment of connection apparatus in accordance with this invention, shown in its operative position connecting a pile to a pre-installed connection sleeve of a pile base or jacket of an offshore structure;

FIG. 18 shows a diagramatic, fragmentary cross-sectional view of an embodiment of connection apparatus in accordance with this invention for simultaneously joining two tubular members in end-to-end relationship;

Figure 19:
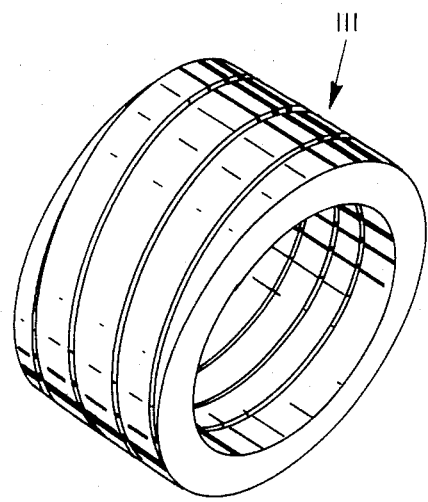
FIG. 19 shows a three dimensional view of a helical member to form part of the anti-extrusion means of this invention, in its relaxed position.
Figure 20:
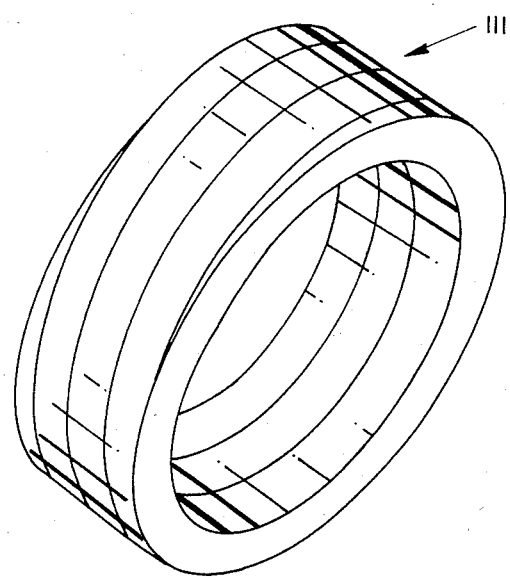
FIG. 20 shows a view similar to that of FIG. 19, with the helical member in its radially expanded position. This has been exaggerated for the sake of illustration.
Figure 21:
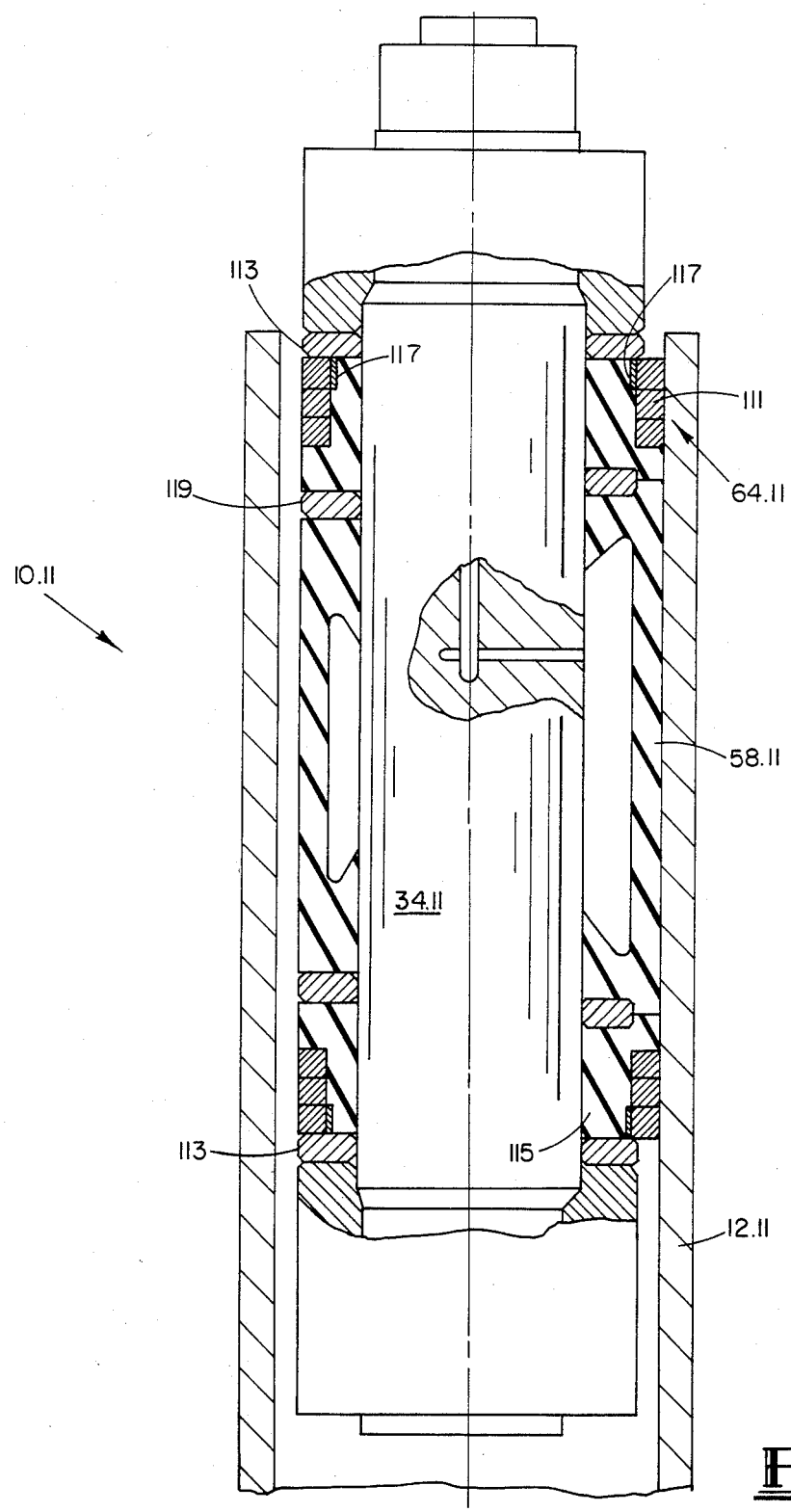
Figure 22:
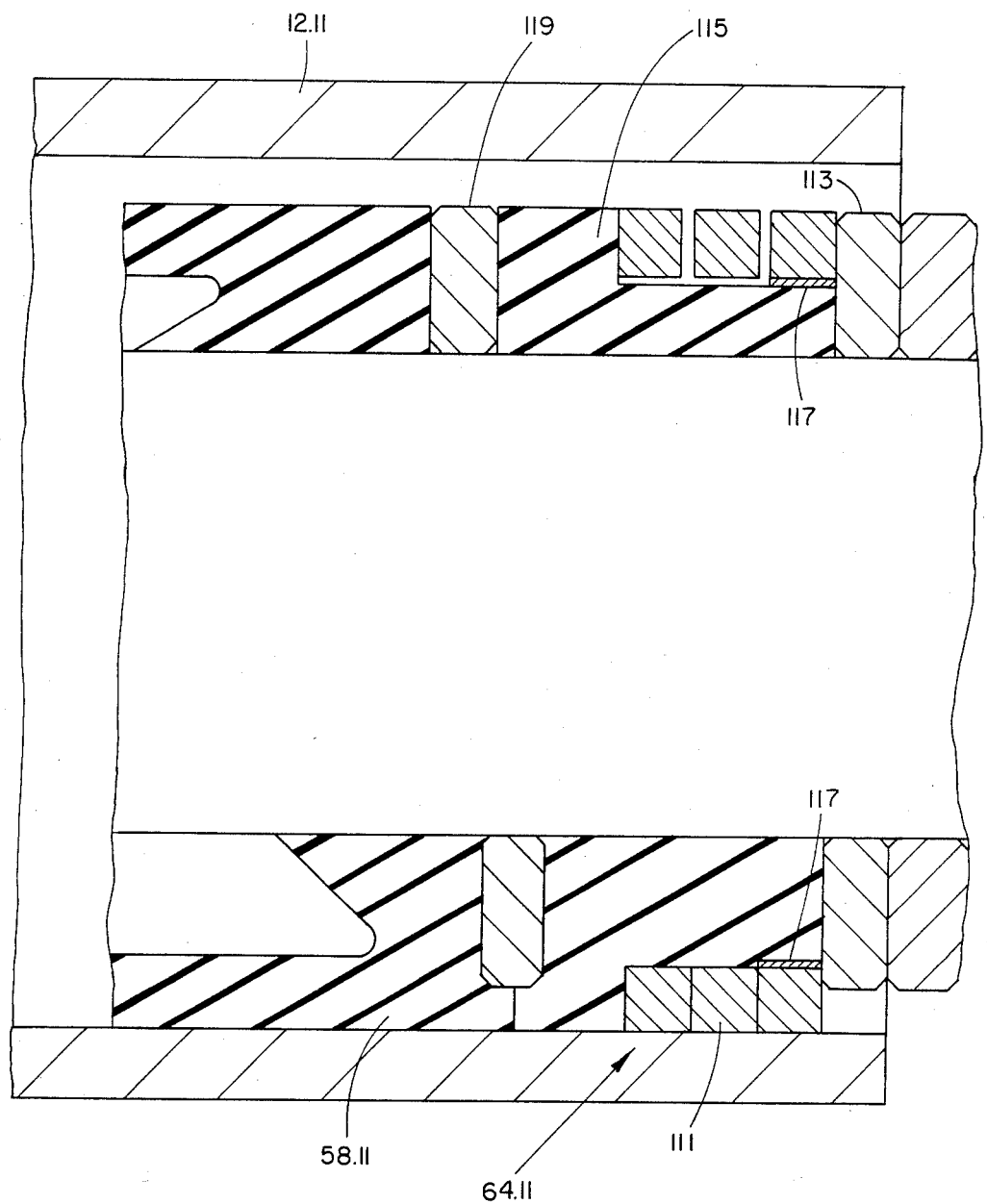
Figure 23:
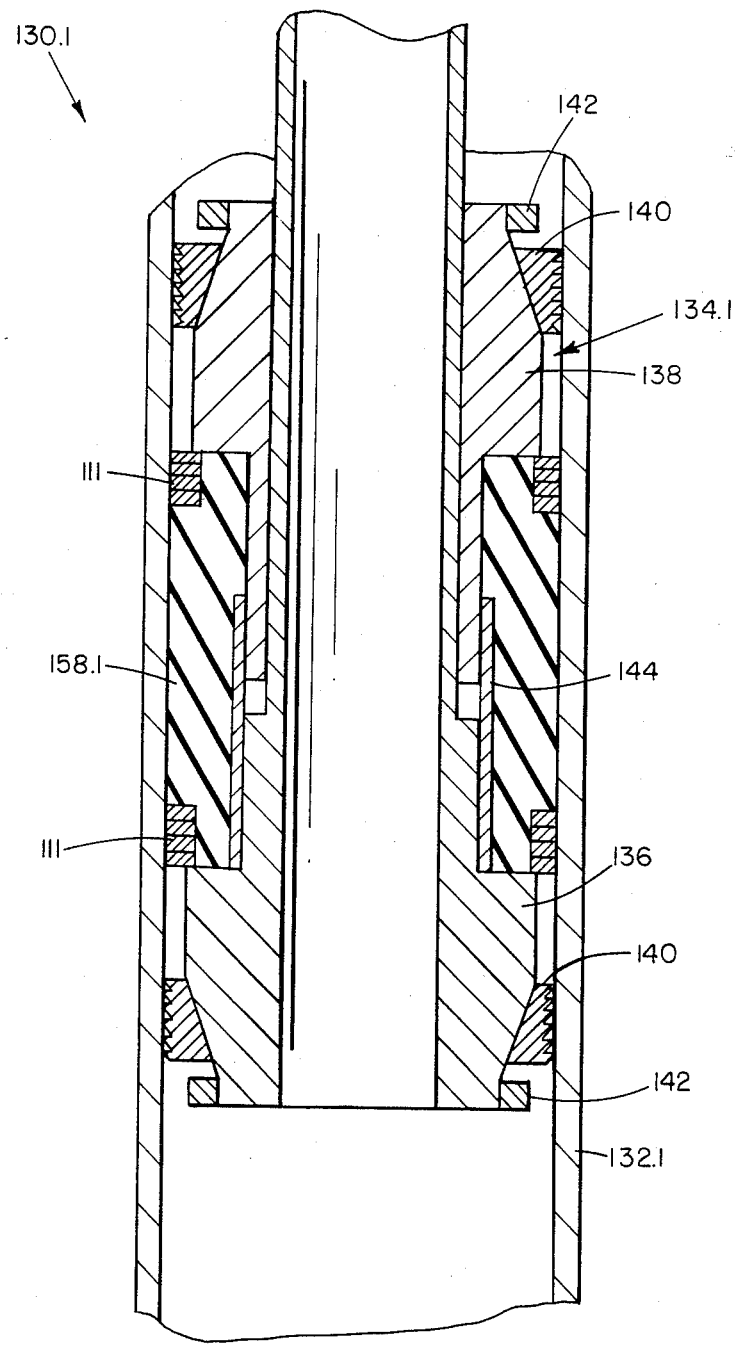
Figure 24:
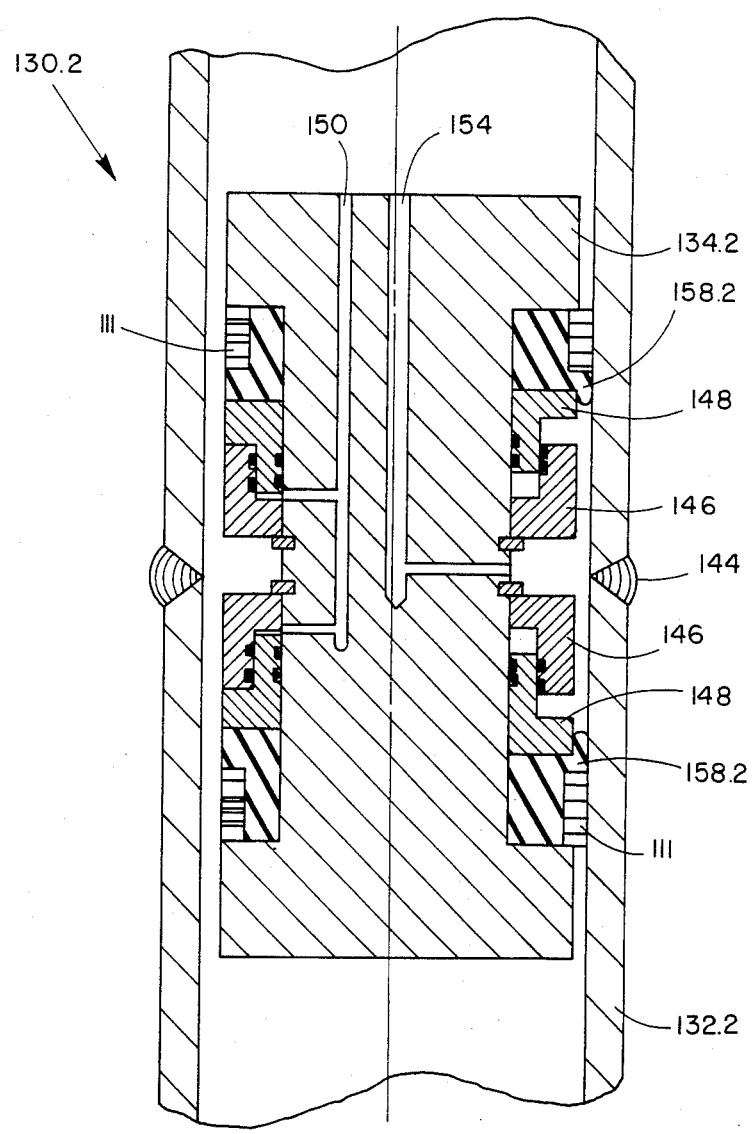
Figure 25:
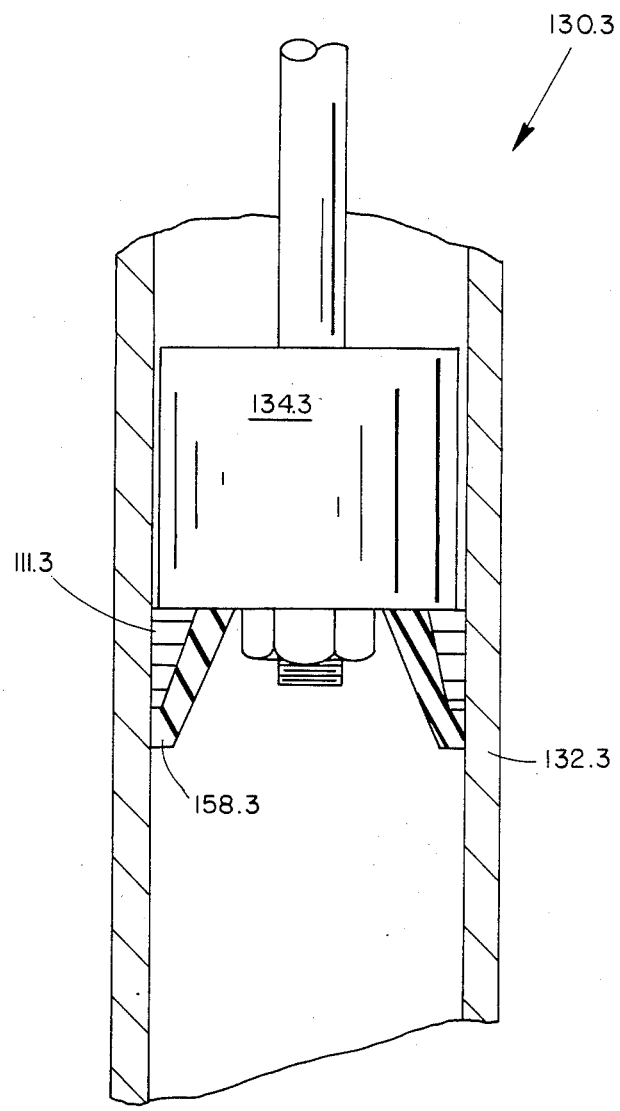
Figure 26A:
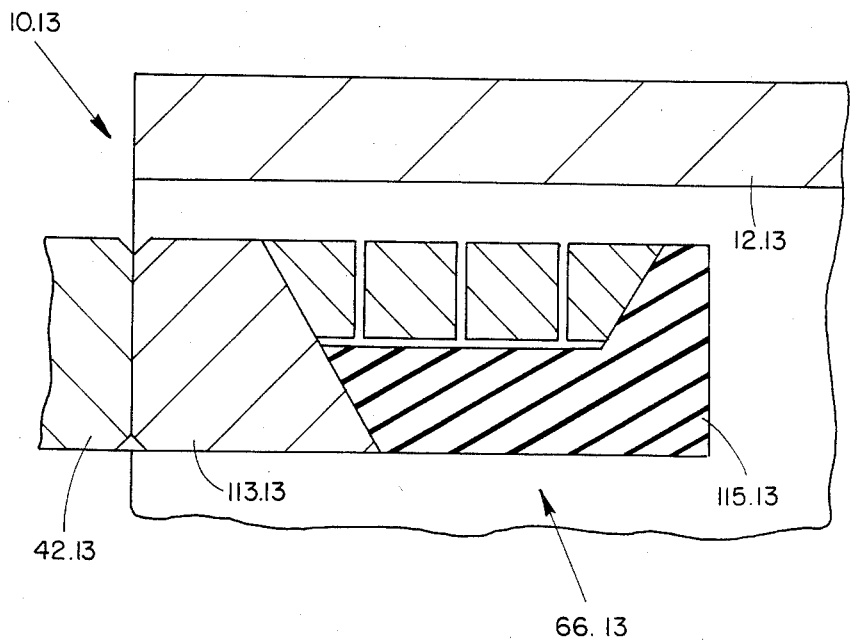
Figure 26B:
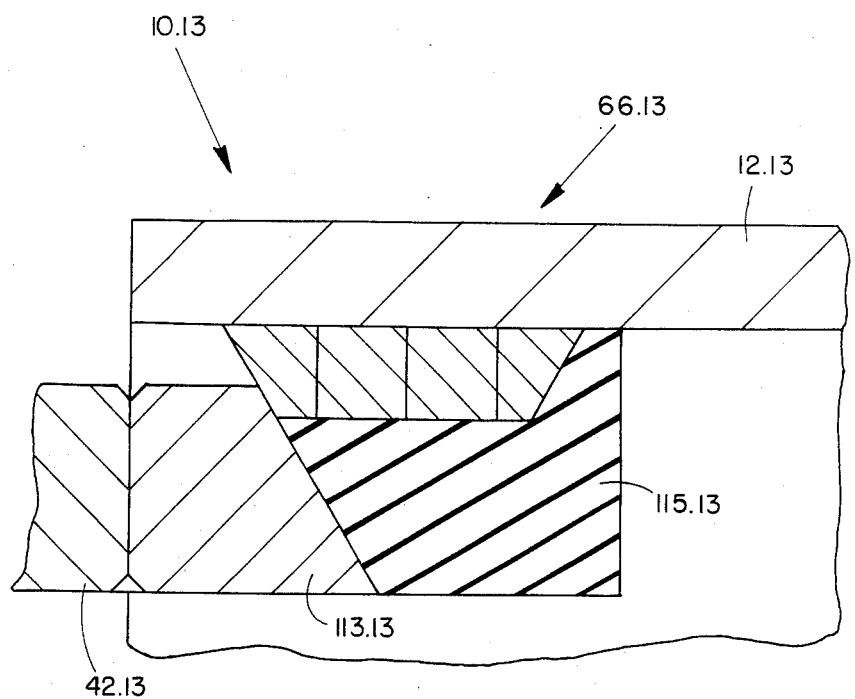
Figure 27A:
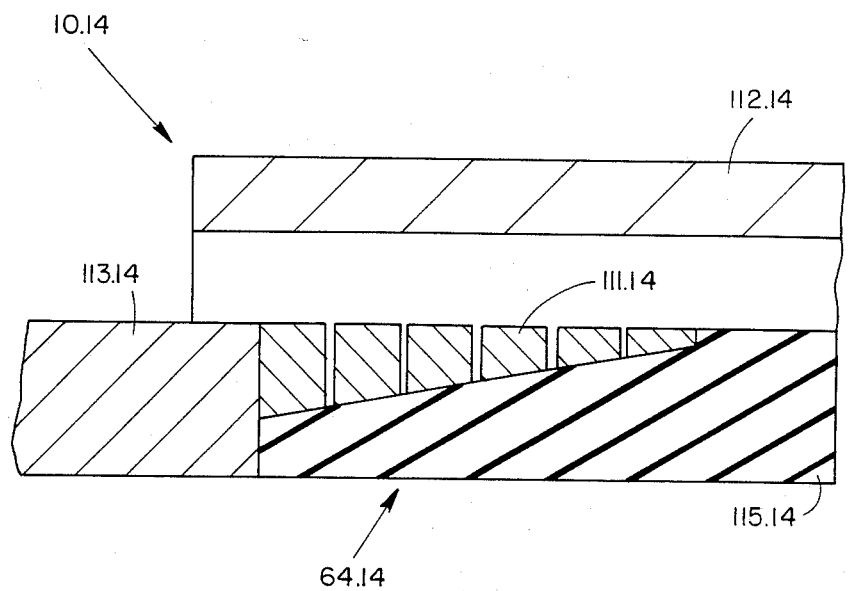
Figure 27B:
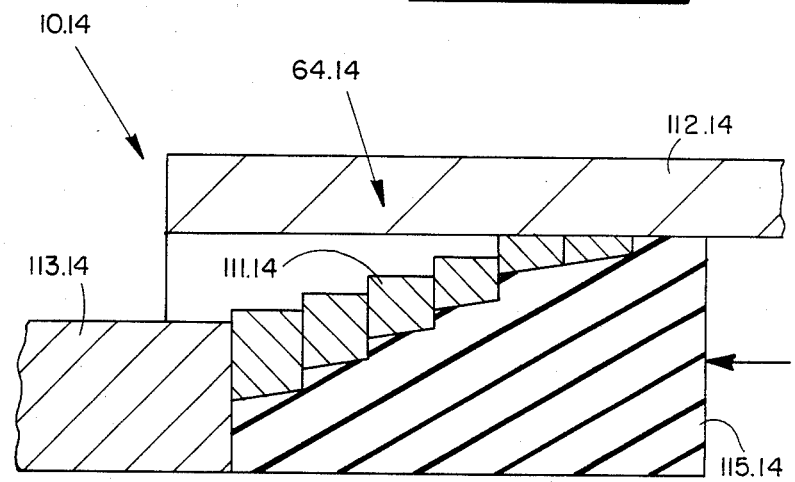
Figure 28A:
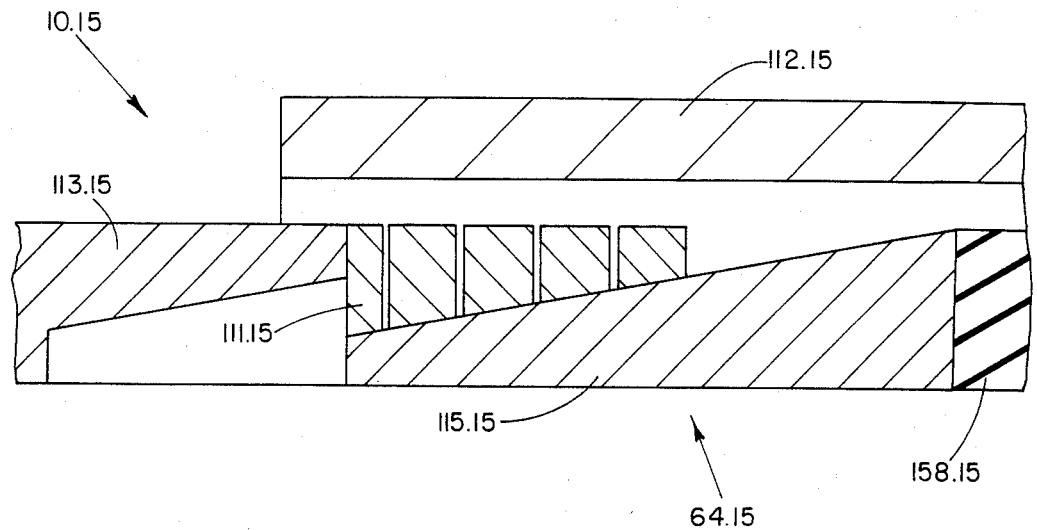
Figure 28B:
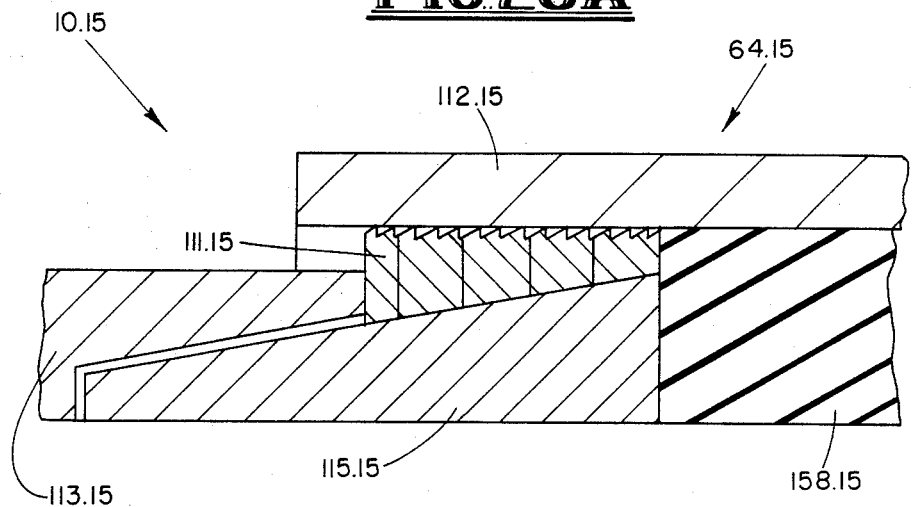

FIG. 21 shows a cross-sectional view of an embodiment of apparatus for use in forming a connection between a pipe section and an annular collar (not shown), utilizing the helical members of FIGS. 19 and 20 as part of the anti-extrusion means. The upper part of FIG. 21 shows the apparatus in its inoperative position, whereas the lower half of FIG. 21 shows the apparatus in its operation condition under pressure;

FIG. 22 shows a detailed view of the anti-extrusion means of the apparatus of FIG. 21 in its relaxed position in the upper part, and in its operative position in the lower part;

FIG. 23 shows a diagramatic, sectional view of apparatus for forming a seal in a tubular member, in the form of a downhole packer positioned in a downhole casing;

FIG. 24 shows a fragmentary, cross-sectional diagramatic view of apparatus for forming an annular seal in a tubular member in the form of a hydrostatic testing device;

FIG. 25 shows a diagramatic, fragmentary, sectional view of apparatus for forming an annular seal in a tubular member, in the form of a high pressure piston device;

FIGS. 26A and 26B show a fragmentary, sectional side elevation of an anti-extrusion member including a wedge action, with FIG. 26A showing the inoperative position, and with FIG. 26B showing the operative position;

FIGS. 27A and 27B show views similar to that of FIGS. 26A and 26B, with the helical member having its inner annular surface tapered relatively to its axis; and FIGS. 28A and 28B show views similar to that of FIGS. 26A and 26B, of yet a further alternative embodiment in which the displacement member is in the form of a conical wedge. In this embodiment FIG. 28A shows the device in its relaxes inoperative position, whereas FIG. 28B shows the device in its operative position. In FIG. 28B the helical member is shown having circumferential external teeth to provide an effective gripping action.

Figure 29:
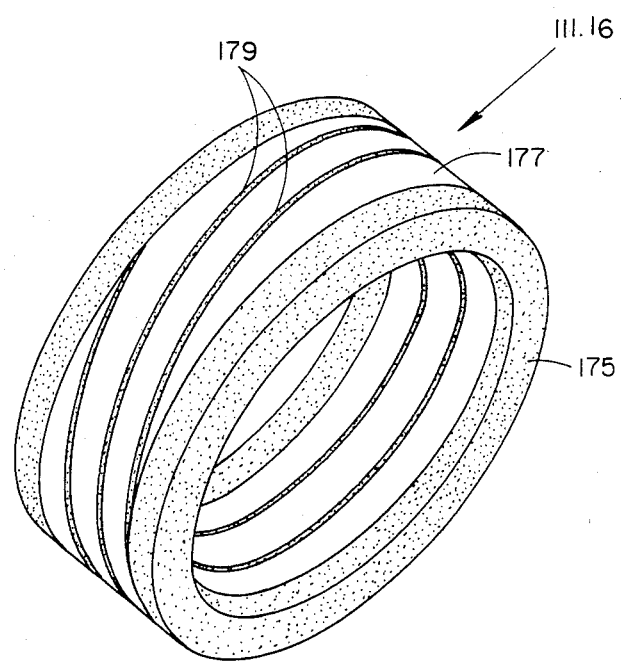

FIG. 29 shows a three-dimensional view of a composite helical member.

With particular reference to FIGS. 1 to 6 of the drawings, reference numeral 10.1 refers generally to connection apparatus for use in forming a high pressure sealed connection between a tubular member in the form of a subsea pipeline section 12.1 and an annular collar 14.1. The collar 14.1 preferably comprises part of the connection apparatus 10.1 as shown.

The connection apparatus 10.1 is shown in its operative position.

The connection apparatus 10.1 comprises the annular collar 14.1 which is positioned to extend over the free end of the pipeline section 12.1 to axially overlap therewith and thereby define a connection zone in the axially overlapped region where the pipeline section 12.1 is to be deformed to form a high pressure connection with the collar 14.1.

The collar 14.1 is shown to include a standard RTJ weld neck flange 16.1 which is welded at 18.1 to a trailing end 20.1 of the collar 14.1.

The flange 16.1 has circumferentially positioned bolt holes 22.1 for use in bolting the flange 16.1 to a complementary flange.

In place of the RTJ weld neck flange 16.1, any other desired or suitable type of flange may be connected to the annular collar 14.1 including, for example, a ball, a ball flange, or quick connector, or any other form of connector.

The apparatus 10.1 includes a connection tool 24.1 which is positioned within the pipe section 12.1 in the connection zone for deforming the pipe section 12.1 during use.

The connection tool 24.1 is removably connected to the flange 16.1 by means of a location flange 26.1, a location sleeve 28.1, bolts 30.1 and studs 32.1.

Figure 1:
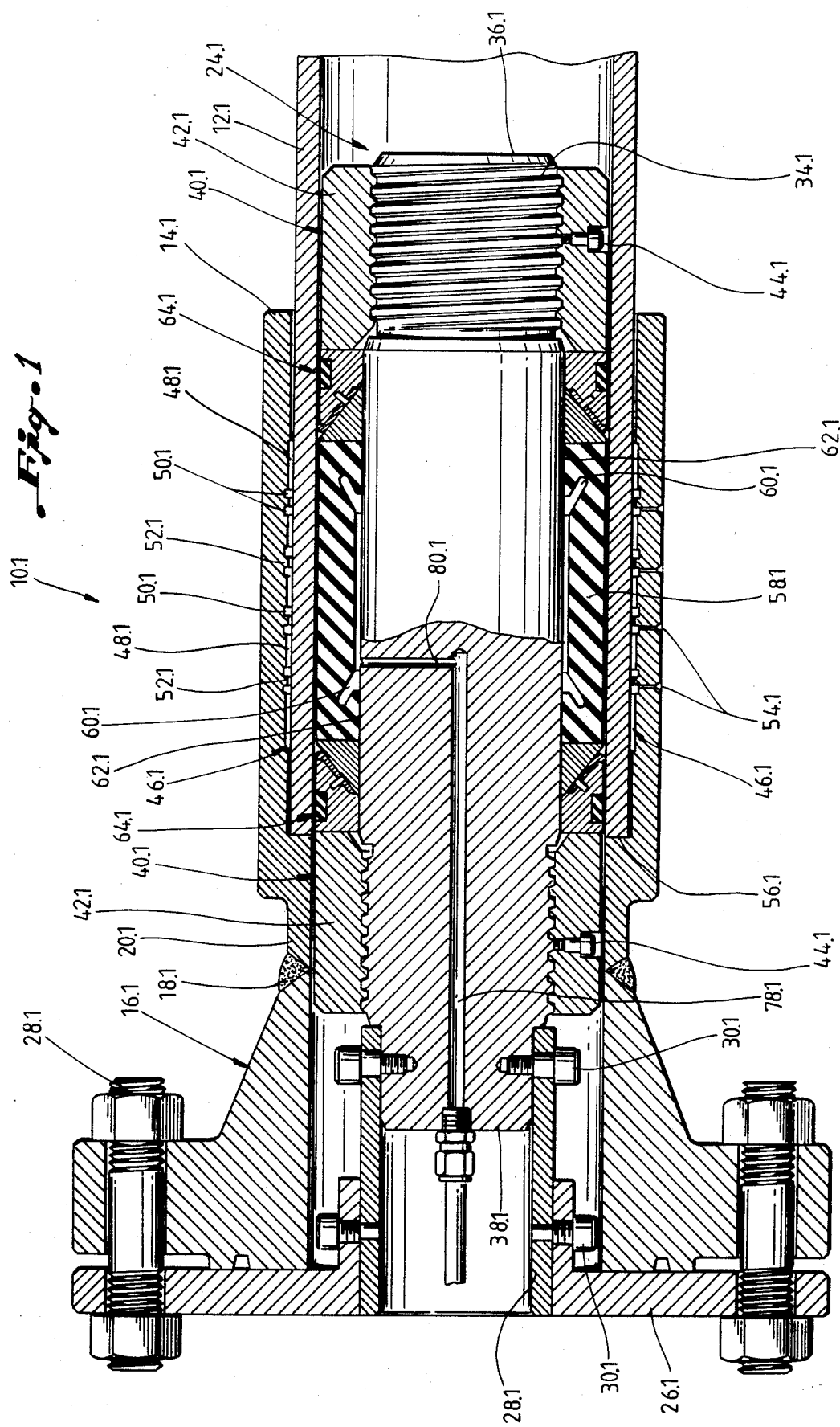
FIG. 1 shows a cross-sectional view of a preferred embodiment of connection apparatus in accordance with this invention, with the connection apparatus shown in its operative position for forming a sealed connection between an annular collar of the apparatus and a tubular member in the form of a subsea pipeline section.

The connection tool 24.1 is removably connected to the collar 14.1 so that they are located relatively to each other for proper and effective operation as shown in FIG. 1.

The connection tool 24.1 comprises an elongated mandred 34.1 having a leading end 36.1 and a trailing end 38.1. The location sleeve 28.1 is connected to the trailing end 38.1.

The connection tool 24.1 has axially spaced confining means 40.1 to define an axially confined zone for registering with the connection zone.

The confining means 40.1 comprises a pair of internally threaded confining rings 42.1 which are mounted on the mandrel 34.1 by being threaded onto the leading and trailing end 36.1 and 38.1 respectively. They are then fixed in their appropriate position by means of fixing set screws 44.1.

The annular collar 14.1 has an internal annular recess 46.1 defined by a plurality of annular grooves 48.1.

The annular grooves 48.1 are formed with pairs of relief grooves 50.1 which are deeper than the annular grooves 48.1 to release fluid from the grooves 48.1 during formation of the connection.

The relief groove 50.1 are provided in pairs to define a plurality of inwardly directed annular embedment teeth 52.1.

The teeth 52.1 are designed to be embedded into the outer surface of the pipe section 12.1 when deformed into the annular recess 46.1, to provide effective axial location of the pipe section 12.1 relatively to the collar 14.1.

The collar 14.1 further has a plurality of relief ports 54.1 which extend from the relief grooves 50.1 at circumferentially spaced intervals to relieve fluid from the annular recess 46.1 during formation of the connection. The relief ports 54.1 may be closed after the connection has been formed.

The connection zone defined between the collar 14.1 and the pipe section 12.1 thus embraces or is aligned with the annular recess 46.1.

The collar 14.1 has a step formation 56.1 which is designed to engage with the free end of the pipe section 12.1 to thereby position the connection tool 24.1 in its appropriate position in the pipe section 12.1.

The connection tool 24.1 further includes a force transmitting sleeve of a solid, deformable material 58.1 which is positioned between the axially spaced confining means 40.1

The force transmitting material 58.1 comprises an annular sleeve of a synthetic rubber such as a NITRILE or HYCAR rubber.

The sleeve 58.1 has a central internal annular recess 60.1 for receiving a fluid under pressure to radially deform the sleeve 58.1. On opposed sides of the recess 60.1, the sleeve therefore has annular zones which engage sealingly with the outer surface of the mandrel 34.1 in the zones 62.1.

Because the surface of the mandrel 34.1 in the vicinity of the sealing zones 62.1 is carefully machined and clean, the rubber sleeve 58.1 can engage sealingly in the zones 62.1 once the pressure applied to the recess 60.1 has reached say 150 to 200 psi.

The connection tool 24.1 further includes axially spaced anti-extrusion means 64.1 which is provided on opposed sides of the sleeve 58.1 between the sleeve 58.1 and the confining means 40.1.

The anti-extrusion means 64.1 is shown in more detail in FIGS. 2 through 6 of the drawings.

The anti-extrusion means 64.1 is designed to cooperate with the inner surface of the pipe section 12.1 to restrain or inhibit, but preferably entirely prevent, extrusion of the transmitting material 58.1 in an axial direction out of the connection zone or beyond the confining means 40.1.

Each anti-extrusion means 64.1 comprises an annular wedge member or band 66.1. The wedge members 66.1 are conveniently made out of a high strength material such as steel and may be connected to the axially directed edge of the transmitting material sleeve 58.1. This serves the dual function of holding the wedge members 66.1 in position during assembly, and of causing the wedge members 66.1 to be retracted when the sleeve 58.1 recovers to its original position after the deformation force has been released as discussed below.

Each anti-extrusion means 64.1 further comprises an annular tension band 68.1 of a resilient material such as rubber, which has a sealing skirt 70.1 extending therefrom.

Each anti-extrusion means 64.1 further comprises a plurality of complementary wedge members 72.1 which are arranged at circumferentially spaced intervals to form an annular band.

Each complementary wedge member 72.1 has a groove wherein portion of the tension band 68.1 is received to thereby locate the complementary wedge members 72.1 in their annular band configuration.

Each wedge member 72.1 has a pin 74.1 mounted therein, and each annular sealing skirt 70.1 extending from the annular tension band 68.1, has a plurality of circumferentially spaced holes 76.1 which are threaded onto the pins 74.1 thereby trapping the sealing skirt 70.1 in position.

When a deformation force is applied to the sleeve 58.1 of force transmitting material, the transmitting material 58.1 will tend to be deformed partially in an axial direction out of the connection zone. This deformation will tend to displace the wedge members 66.1 axially in a direction out of the connection zone. Such axial displacement will cause the wedge members 66.1 to cooperate with the complementary wedge members 72.1 to bias and thus displace the complementary wedge members 72.1 in a radial outward direction for the tension bands 68.1 and the sealing skirt 70.1 to engage firmly with the inner surface of the pipe section 12.1 on opposed axial sides of the sleeve 58.1.

The engagement between the sealing skirt 70.1 and the inner surface of the pipe section 12.1 will increase as the axially directed deformation force on the sleeve 58.1 increases so that the anti-extrusion means 64.1 can reestrain or inhibit, if not totally prevent, extrusion of the transmitting material 58.1 in an axial direction out of the connection zone.

This provides the advantage that the integrity of the transmitting material sleeve 58.1 can be retained to allow re-use of the sleeve, and that the deformation force will tend to be used effectively for radial deformation of the sleeve 58.1 and thus for radial expansion of the pipeline section 12.1 in the connection zone.

The anti-extrusion means 64.1 is shown in FIGS. 1, 2 and 3 of the drawings in its rest or inoperative position. It is shown in its operative position in FIGS. 4, 5 and 6.

A synthetic rubber is believed to be effective for the transmitting material sleeve 58.1 since it is highly deformable under a net loading, is incompressible when trapped in all directions, is relatively easy to seal, will return to virtually its original shape after a deformation cycle, will not concentrate loads and stresses, and will easily conform to non-uniform shapes. It can further have a sufficient resistance to tearing or failure to provide resistance to extrusion in an axial direction, and to provide resistance to failure as a result of such extrusion.

The connection apparatus 10.1 further includes force application or direction means for gradually applying a deformation force to the transmitting material 58.1 to cause gradual deformation thereof in a radial direction and thus ccause radial expansion of the walls of the pipeline section 12.1 in the connection zone.

The force application means comprises a high pressure bore 78.1 in the mandrel 34.1, and a radially extending bore 80.1 which leads to the recess 60.1 of the transmitting material sleeve 58.1.

The bore 78.1 is adapted for connection to a source of high pressure fluid.

It may be therefore connected to a source of high pressure fluid provided by a high pressure pump or by a pressure intensifier of any suitable conventional type.

For example, a high pressure air driven pump may be used which can be driven by means of air at a pressure of about 120 psi to provide a hydraulic fluid or sea water at a pressure of up to about 50,000 psi. Such an air pump can be driven using air under pressure from an air hose of the type commonly used in subsea environments. Nitrogen under pressure may also be used for the purpose of driving such an air pump.

In an alternative example, an intensifier may be used which can intensify a starting pressure of say 3000 psi to a working pressure of say 50,000 psi.

The collar 14.1 is designed in relation to the pipeline section 12.1 with which it is to be used, that the outer to inner diameter ratio of the collar is approximately equal to the outer to inner diameter ratio of the pipeline section 12.1. The collar 14.1 is further designed so that the tensile strength or elastic limit of the collar is at least about 3 times that of the pipeline section 12.1.

Within these parameters optimum residual pressure between the collar and the pipeline section can be achieved after proper deformation, to provide the most effective high pressure seal. If the tensile strength ratio of the collar to the pipe section is increased, the wall thickness ratio may be decreased. However, if the 3 to 1 tensile strength ratio is provided, any greater wall thickness of the collar 14.1 will lead to wastage and may require unnecessarily high pressures for expansion.

In use, with the collar 14.1 removably connected to the connection tool 24.1 by means of the location flange 26.1 and location sleeve 28.1, the connection apparatus 10.1 can be stabbed over the end of the pipeline section 12.1 until the step formation 56.1 seats on the free end of the pipeline section 12.1.

The high pressure bore 78.1 can then be connected to the high pressure outlet of an air pump which can produce sea water at a pressure of between about 40,000 to 50,000 psi, and conveniently at about 25,000 psi. Such a high pressure air pump would be driven by air from a conventional air line supplying air at pressure of about 120 psi.

A stretch gauge (not shown) would be provided around the periphery of the collar centrally of the connection zone to measure deformation of the collar.

The high pressure pump is then started and is allowed to pump sea water under pressure into the recess 60.1 of the rubber sleeve 58.1.

As the pressure increases, the rubber 58.1 will be forced to expand against the inside surface of the pipeline section 12.1 in the connection zone, and will be forced to expand against the outer surface of the mandrel 34.1 in the annular sealing zones 62.1. Such sealing will have been achieved at a pressure of say 200 psi.

Sealing in the annular sealing zones 62.1 should not be a significant problem because the cooperating surfaces are tailor-made and are smooth without any significant defects.

On the other hand, the pipeline section 12.1 would rarely be expected to provide the same sealing properties. If it has been in use, the pipeline section 12.1 would tend to be dimensionally inconsistent and could have an oval cross-section. It would also tend to have an inner surface which may be corroded, which may be pitted, and which may be scoured. It is therefore extremely difficult to provide a seal against such surface which would be effective to prevent loss of fluid through such a seal, and would even be effective to prevent extrusion of the rubber 58.1 past such seal.

To avoid this problem and allow the connection apparatus 10.1 to be used with pipeline sections of the type commonly found in subsea environments, the specifically designed anti-extrusion means 64.1 has been provided.

As the pressure builds up within the recess 60.1 of the rubber sleeve 58.1, a degree of deformation of the rubber 58.1 in the axial direction will occur. This will cause axial outward displacement of the wedge members 66.1. They exercise their wedging action on the complementary wedge members 72.1 to bias and then displace the complementary wedge members 72.1 radially outwardly against the tension exercised by the annular tension bands 68.1.

Since the complementary wedge members 72.1 are axially located by the confining means 40.1, they will be displaced in a radial outward direction until the sealing skirts 70.1 engage sealingly with the inner surface of the pipeline section 12.1. The degree of engagement will increase as the force increases to thereby effectively present a barrier to extrusion of the rubber sleeve 58.1 in an axial direction out of the connection zone.

Since the rubber is effectively trapped, and is restrained against escape, pressure may be increased within the recess 60.1 to any desired level, limited only by the structural ability of the parts to retain it.

As the pressure increases further, the pipeline section 12.1 will commence to expand radially outwardly in the connection zone. Such expansion will initially comprise purely elastic deformation or expansion of the pipeline section 12.1. Thereafter it will continue to expand in a plastic manner until it makes contact with the annular collar 14.1.

Since expansion due to pressure follows the path of least resistance, contact between the pipeline section 12.1 and the collar 14.1 during deformation will be forced to be uniform.

After full contact has been established between the expanding pipeline section 12.1 and the annular collar 14.1 in the connection zone, a further increase in pressure will cause the annular collar 14.1 to expand radially in an elastic fashion.

During such expansion any sea water or other fluid contained in the annular recess 46.1 will be released through the relief ports 54.1 thereby permitting full and effective deformation of the pipe section 12.1 into the internal annular recess 46.1 and into the annular grooves 48.1 to provide intimate contact.

Figure 6:
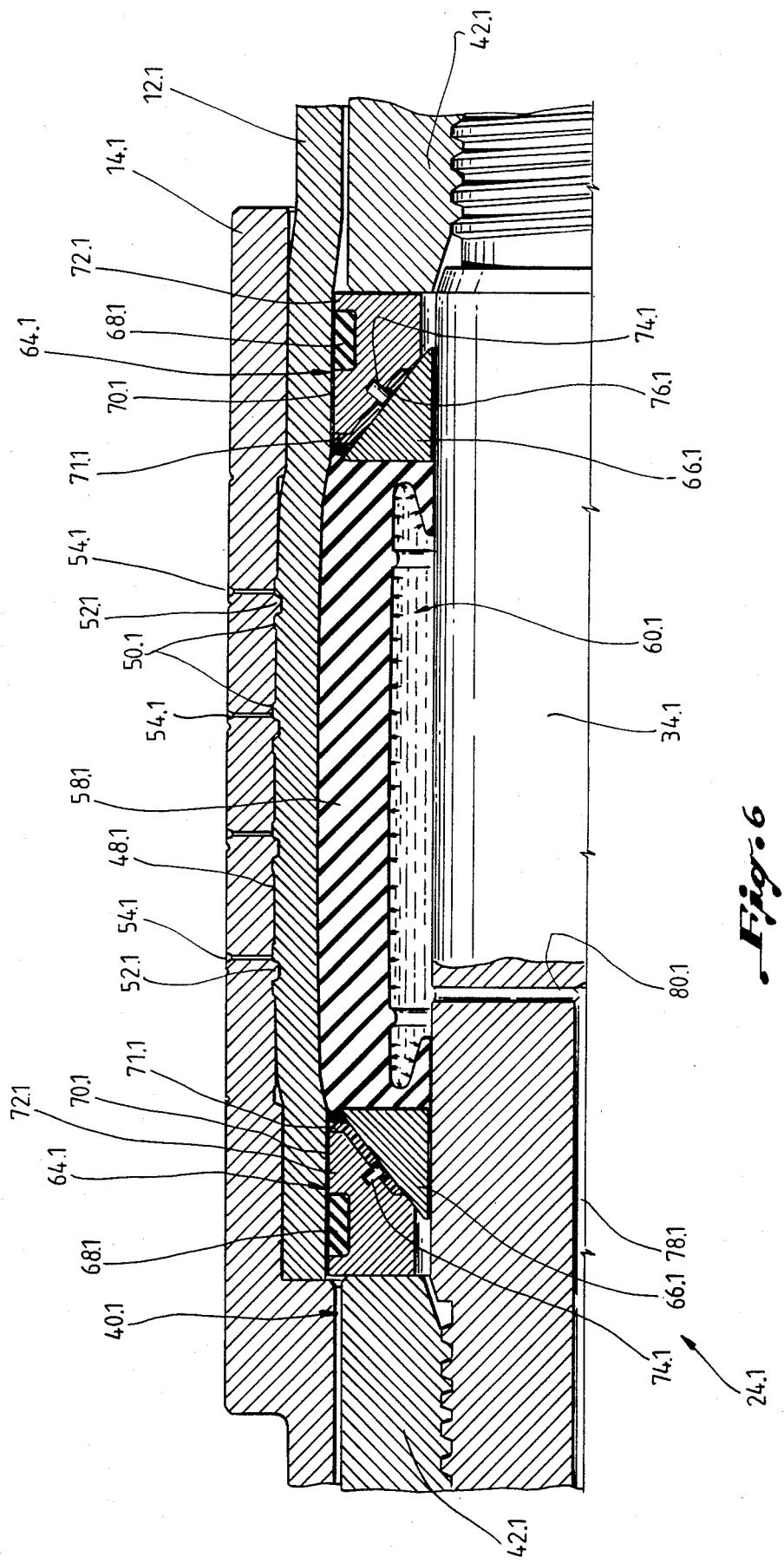
FIG. 6 shows, to an enlarged scale, a fragmentary cross-sectional view of the connection apparatus of FIG. 1 to demonstrate the apparatus in its final position before the deformation force has been released.

During such deformation of the pipeline section 12.1, the annular embedment teeth 52.1 are designed to penetrate into the outer surface of the pipeline section 12.1 (as shown in FIG. 6) to provide a positive axial engagement between the pipeline section and the annular collar.

Application of the deformation pressure will be continued until a strength gauge indicates that the annular collar 14.1 is on the point of entering a plastic yielding phase. At this point, the deformation pressure will be terminated.

Release of the deformation pressure will allow the rubber sleeve 58.1 to contract and substantially restore to its initial position. Such contraction will additionally draw the opposed wedge members 66.1 axially towards each other for the anti-extrusion means 64.1 to release from the pipeline section 12.1

The connection tool 24.1 can then be unbolted from the flange 16.1, and can be withdrawn.

The stretch gauge employed to monitor radial expansion of the annular collar 14.1 may be a mechanical or electronic device that may be monitored by a diver or from the surface. If desired the stretch gauge may be electrically wired to automatic control means, which may include a solenoid valve, that will automatically shut off the supply of pressure fluid when a predetermined magnitude of collar stretch has been reached.

Because tensile strength and diameter ratios of the pipe section 12.1 and annular collar 14.1 have been appropriately designed or selected, and because the pipeline section 12.1 has been elastically and plastically deformed while the annular collar 14.1 has been elastically deformed, release of the deformation pressure will allow the annular collar 14.1 to recover elastically. Its residual tensile strength will apply a compressive force to the pipeline section 12.1 to provide a high pressure metal-to-metal seal. An effective long term interference fit results between the annular collar 14.1 and the pipeline section 12.1. The annular embedment teeth 52.1 further improve sealing and the strength of the connection against axial displacement of the components.

Because the rubber sleeve 58.1 can be expanded at a relatively slow rate, the rate of deformation can be precisely controlled and can be very accurately monitored. Because a slow rate of deformation is employed, the deformation stress will tend to be much lower than in the case where a rapid deformation process is employed.

The required axial length of the connection zone may be designed for each particular application. The appropriate connection zone is found by dividing the total axial yield load of the pipeline section 12.1 by the assumed coefficient of friction. This gives the total radial load necessary between the pipeline section 12.1 and annular collar 14.1. This load, when divided by the contact pressure, will yield the necessary contact area.

To further increase the connection strength, the pipeline section 12.1 may further be belled slightly into an appropriate recess in the annular collar 14.1 so that a wedging action would be necessary to separate the connection. Belling of the pipe into the annular collar 14.1 allows the connection to make use of the hoop strength of the mating pipeline section 12.1 and annular collar 14.1 to aid in restraining axial separation loads.

The embodiment of the invention as illustrated in FIGS. 1 through 6 of the drawing can provide a number of advantages.

The connection apparatus 10.1 has overall compactness and is relatively simple and rugged. It eliminates the need for sophisticated control and support equipment. The slow rate of deformation allows a degree of control which is not possible with explosive deformation techniques, with mechanical cold forging or with conventional grip mechanisms.

The system involves no significant inherent energy losses and no additional plastic deformations are needed to effect the connection other than those required to uniformly yield the pipe section 12.1 outwardly and possibly those associated with embedment of the embedment teeth 52.1. Therefore, a minimum amount of metallurgical changes will occur in the material of the pipeline section 12.1.

The resulting connection can provide a smooth transition from the connection to the unconnected pipeline allowing a minimum transition effect and a minimum pipewall decrease in the transition area.

Because of the use of a solid deformable force transmitting material in the form of the rubber sleeve 58.1, and because of the effective use of anti-extrusion means, it is believed that a connection can be made to a pipeline section 12.1 even if it has marginal internal conditions (that is a pipeline section possessing corrosion grooves and other internal non-uniformities).

The force which may be employed to expand the rubber sleeve 58.1, may include the direct application of hydraulic pressure, the application of an expanding fluid such as freezing pressurized water, or even mechanical expansion.

Applicant has calculated certain anticipated sample values of connection parameters. These are set out in Examples 1 and 2 below.

EXAMPLE 1

Pipe specification—
 O.D.=12.75 inches
 I.D.=11.75 inches
 Grade=API-5LX-52 (52,000 psi yield)
Annular collar—
 I.D.=12.950 inches
 O.D.=14.125 inches Yield strength=140,000 psi
Pressure to yield pipe=4,425 psi
Pressure to yield connector=12,700 psi
Transform pressure to point of application gives total of above 22,800 psi applied to rubber
Length needed for embedment teeth—3.75 inches
Length needed for interference fit—7.6 inches
Therefore connect at least 8 inches in length

EXAMPLE II

Pipe specification—
 O.D.=36 inches
 I.D.=34.25 inches
 Grade=API-5LX-65 (65,000 psi yield)
Annular collar—
 I.D.=37 inches
 O.D.=B 38.90 inches Yield strength=140,000 psi
Pressure to yield pipe equals 3,320 psi
Pressure to yield connector=7,200 psi
Transform pressure to point of application gives total of about 12,200 psi applied to rubber
Length needed for embedment teeth—18.34 inches
Length needed for interference fit—13.87 inches
Therefore connect at least 18.5 inches in length With reference to FIGS. 7 and 8 of the drawings, reference numeral 24.2 refers generally to an alternative embodiment of a connection tool for the connection apparatus of this invention.

As in the case of the connection tool 24.1, the connection tool 24.2 has a mandrel 34.2 and has confining rings 42.2 mounted thereon to define the confined zone wherein the transmitting material 58.2 is positioned.

The transmitting material 58.2 is again in the form of an annular sleeve 58.2 of an appropriate rubber. However, in place of the anti-extrusion means 64.1, the connection tool 24.2 includes anti-extrusion means 64.2 which is integrally connected to the sleeve 58.2.

The anti-extrusion means 64.2 comprises steel and fiber reinforced elastomer bands 65.2 which are provided along the outer axial peripheries of the sleeve 58.2.

In use, when pressure is applied to the recess 60.2 the rubber 58.2 will expand until it forces the bands 65.2 against the confining rings 42.2 and against the inner wall surface of the pipeline section.

Because the bands 65.2 are steel and fiber reinforced, they are resistant to extrusion. However, because they are elastic, they can be jammed against the pipe wall and provide a reasonably effective anti-extrusion seal even where the pipe wall is corroded or non-uniform.

With reference to FIGS. 9 to 11 of the drawings, reference numeral 24.3 refers to yet a further alternative embodiment of a connection tool in accordance with this invention.

In the connection tool 24.3 the anti-extrusion means 64.3 comprises a plurality of segmented steel blocks which are bonded to the rubber sleeve 58.3, and are arranged in two annular bands along the opposed outer axial peripheries of the sleeve 58.3.

Expansion of the rubber will cause the steel blocks 65.3 to become wedged against the confining rings 24.3 and against the inner surface of the wall of the pipeline section to provide resistance to axial extrusion of the rubber 58.3.

With reference to FIGS. 12 to 14 of the drawings, reference numeral 24.4 reers to yet a further alternative embodiment of a connection tool in accordance with this invention.

In the connection tool 24.4, the transmitting material again comprises an annular sleeve 58.4 of rubber.

The sleeve 58.4 includes anti-extrusion means 64.4 in the form of elongated beams 65.4 which are embedded in the sleeve 58.4 to extend axially through the sleeve at circumferentially spaced intervals.

Each beam 65.4 has an end cap 67.4 integrally mounted at each of its opposed ends.

Each end cap 67.4 has, as can be seen particularly in FIG. 14, a radially extending tongue 69.4 at one end, and a complementary radially groove 71.4 at the opposed end.

The end caps 67.4 are thus arranged in two annular bands at the opposed axial ends of the sleeve 58.4. In each annular band constituting the anti-extrusion means 64.4, the tongue of one end cap 67.4 is engaged with the groove 71.4 of its adjacent end cap 67.4 to thereby block the grooves between adjacent end caps to prevent extrusion of the rubber 58.4.

When the pressure is applied to expand the rubber 58.4, radial movement of the rubber will cause the beams 65.4 to be displaced radially thereby displacing the end caps 67.4 radially against the inner wall of the pipe section. Such jamming action will restrain extrusion of the rubber 58.4 past the end caps 67.4.

With reference to FIG. 15 of the drawings, reference numeral 24.6 refers to yet a further embodiment of a connection tool in accordance with this invention.

In the connection tool 24.6 further alternative forms of anti-extrusion means 64.6 are provided between the rubber sleeve 58.6 and the confining rings 42.6.

Each anti-extrusion means 64.6 comprises three annular steel wave rings 65.6 which are embedded in an annular cylinder of rubber, with the annular cylinder of rubber being located between two annular steel plates 67.6.

Upon expansion of the rubber sleeve 58.6, the anti-extrusion means 64.6 will be compressed between the steel plates 67.6. This will force the waves of the wave rings 65.6 to become shallower and thereby increase the effective lengths of the wave rings 65.6. They will thus become forced against the inner surface of the wall of the pipe section to prevent extrusion beyond the anti-extrusion means 64.6.

With reference to FIG. 16 of the drawings, reference numeral 10.7 refers generally to an alternative embodiment of connection apparatus in accordance with this invention.

The connection apparatus 10.7 corresponds substantially with the connection apparatus 10.1. It is shown to include force application means in the form of an intensifier 80.7, and is shown to include a stretch gage 82.7.

The intensifier 80.7 would typically have an inlet 81.7 for connection to a source of fluid under pressure such as at a pressure of say 3,000 psi, has a major plunger 84.7 and a minor plunger 86.7 to provide a final pressure of say 40,000 psi.

With reference to FIG. 17 of the drawings, reference numeral 10.8 refers to yet a further alternative embodiment of a connection apparatus in accordance with this invention.

The connection apparatus 10.8 again corresponds generally with the connection apparatus 10.1 except that the connection apparatus 10.8 is used for connecting a pile 88.8 to a pre-installed connection sleeve 14.8 of a pile base or jacket 90.8.

In the connection apparatus 10.8, the connection tool 24.8 is connected to the collar 14.8 by means of a tool locating sleeve 26.8. The connection tool 24.8 is shown having a high pressure pump 92.8 mounted thereon with a pump operation fluid line 94.8 and a tool lift line 96.8 in position.

When a pile 88.8 is to be secured to a collar 14.8, a high pressure sealing engagement is typically not required. What is required is to deform the walls of the pile 88.8 radially outwardly into the annular recess 46.8 of the collar 14.8 to provide an interference fit.

With reference to FIG. 18 of the drawings, reference numeral 10.9 refers generally to yet a further alternative embodiment of connection apparatus in accordance with this invention.

The connection apparatus 10.9 corresponds generally with the connection apparatus 10.1 but is used for simultaneously joining two pipeline sections 12.9 in end-to-end relationship to a single annular collar 14.9.

The connection apparatus 10.9 has a connection tool 24.9 which is virtually in the form of a double connection tool 24.1 for operating simultaneously or successively on the end sections of the two pipeline sections 12.9 which are stabbed into opposed ends of the collar 14.9.

The connection tool 24.9 is mounted on rollers 92.9 to allow the connection tool 24.9 to be drawn through the pipeline.

The connection tool 24.9 further includes indexing latch and activation means 94.9 for engaging with an indexing groove 96.9 in the collar 14.9 to positively locate the connection tool 24.9 for use and to indicate when use can commence.

With reference to FIGS. 19 and 20 of the drawings, reference numeral 111 refers generally to a helical member which is designed to constitute a portion of an alternative embodiment of an anti-extrusion member in accordance with this invention.

The helical member 111 resembles a helical spring with square or rectangular section coils. A conventional helical spring member has large spacing between turns and the spring wire is loaded in torsion as the spring is compressed or extended in the axial direction. The helical member 111 may be similar to a conventional helical spring, but is preferably manufactured to avoid the tortional loading in the axial direction. In one preferred manufacturing technique, therefore, the device may be manufactured by machining appropriate material in a tubular shape that matches the overall design dimensions. Thereafter, using a thin grooving tool or the like, the tubular shape can be cut through the wall thickness on a spiral pitch as required for a particular design. The cut helix may then be clamped in a fixture to limit distortion during heat treatment. This is a common technique and is optional. The device may then be heat treated in conventional manner to increase mechanical properties (namely the yield strength). Thereafter anti-friction coatings may optionally be applied to reduce frictional resistance to any winding or unwinding action during use. Anti-friction coatings could typically include coatings such as teflon, molybdenum di-sulfide, grease, oil or the like.

The principle of operation of the helical member 111, is that it will circumferentially "unwind" in response to an internally applied pressure to produce radial displacement of the member 111. Conversely, in response to externally applied pressure, the helical member 111 can be wound more tightly to produce radial compression. The unwinding (or winding) action results from a bending moment in each section which occurs when pressure is applied along the inner (or outer) circumference. The bending moment in each section causes the radius of curvature of each winding to increase (or decrease), thus diametral growth results.

The helical member should preferably have the spaces between adjacent coils kept as small as possible so that when a displacement force is applied to the helical member 111, the gaps between adjacent coils will first close and thereafter will the helical member be subjected to diametral growth.

The helical member 111 is therefore designed to provide diametral growth but, because it is a continuous member, such growth can be achieved without causing additional axial extrusion pores to open through the helical member 111.

There are numerous industrial applications which require the utilization of very high hydrostatic pressures (that is pressures of 10,000 psi and above). Containment of pressures of these magnitudes is complicated by the fact that the pressure level is generally larger than the strength of conventional elastomeric seals that are customarily used for containment of lower pressures. Therefore, any clearance gap left between mating parts to be sealed will provide a space for extrusion of and failure of conventional elastomeric seals.

These problems become greter in the case of used pipeline sections, downhole casings and large diameter pipelines, since their manufacturing processes do not guarantee smooth surface finishes and small dimensional tolerances. In addition, of course, corrosion can contribute significantly to the problems involved in providing effective seals with such surfaces.

Where a localized area to be sealed (or isolated) is a significant distance along the bore from the accessible end of a pipe, even greater problems are created. Any internal sealing device must be small enough to slide through the bore and accommodate pipe curvature, ovality, connection upsets and the like to prevent the device from "hanging" or from "sticking" before reaching the zone to be sealed. Retrieval of such a device after used requires that the device must collapse back to nearly its original diameter so that it may be withdrawn through the original restrictions.

Various attempts have therefore been made to design effective extrusion devices for use with elastomeric seals. However, where high hydrostatic pressures are to be encountered the anti-extrusion means must usually be a relatively rigid material such as steel. Steel is, however, not very flexible compared to the elastomeric material that is must contain. Diameter expansions of 1% are excessive for a continuous steel ring. Therefore, multiple segments of steel will generally have to be arranged in an annular band. However, as the multiple steel segments move radially outwardly to provide their anti-extrusion function, increased segment spacing results. The result is that the annular gap becomes closed at the expense of several smaller axially directed gaps between the segments. Gaps may be closed with additional segments, or may be left open and thereby sacrifice a portion of the sealing material. The former procedure is difficult to design and manufacture effectively, whereas the latter is generally unacceptable.

In use of the helical member 111, the operational limits of diametral expansion without permanent deformation is dictated by the material strength for any given annular thickness. Of course, the annular thickness of the device must usually be greater than the annular gas to be closed off. Additionally, if the annular thickness is too great, the pressure required to expand the device must be excessive. Therefore, for any given design requirements, an optimum annular thickness should be determined. The axial length of the device should be determined by the shear strength of the device related to the pressure to be contained.

The helical member 111 is essentially a long, curved beam that experiences a change in curvature due to the applied pressure. Standard mechanical engineering equations can therefore be used to describe the approximate bending stress in a curved beam due to a change in radius of curvature.

For a six inch pipeline connection tool, and allowing a maximum bending stress of 180,000 psi for high strength steel, the maximum annular thickness of the helical member 111 may be determined as amounting to 0.426 inches in relation to an annular gap of 0.232 inches. The helical member 111 will therefore be able to completely close the gap and have a radial contact width of 0.194 inches remaining for axial support.

The activation pressure required to unwind and expand the device to the internal diameter of the six inch pipe may be estimated using a method shown by Timoshenko's Strength of Materials Stretched as applied to a ring with a circumferential split which is loaded by a uniform pressure.

On the basis of the calculated dimensions, the calculated pressure to create an average radius of curvature change equal to that necessary to fill the extrusion gap would be 825.9 psi.

This would be a small portion of the contained pressure of 30,000 psi and would be smaller than the approximate 3,000 psi strength of a typical rubber which would be used as the force transmitting sleeve. This demonstrates that the helical member will be activated to close the annular gap before any extrusion of such rubber can occur through the gap.

Calculation of the required axial length of the helical member 111 is very simple. Using standard techniques, this can be calculated for the assumed parameters, to be equivalent to 0.363 inches. This length can be increased to 0.5 inches for convenience to provide for 2½ turns with a pitch of 0.2 inches per turn.

If an interwinding gap of 1/32nd inch is assumed, the axial force required to compress the coil axially is 12.5 lbs. The interwinding spaces will therefore be closed immediately upon application of pressure.

It will be appreciated that the performance limits of the helical member 111 in terms of maximum allowable gap accommodated are dependent upon the material properties. An engineer with ordinary skill may deduce from standard equations that the allowable gap to diameter ratio is essentially constant for all diameters for any set of material properties and stress criteria. The most important material properties are Youngs modulus of elasticity and the tensile yield strength. High strength tool steel with a tensile yield strength of over 300,000 psi may be used to accommodate radial gaps of up to 20% of the radius without permanent deformation. In cases where large gaps are to be accommodated with low activation pressures, materials such as titanium and phosphor bronze may be used since they are strong and are approximately 80% more flexible than steel (that is they will deflect 80% more under the same load and stress). In cases where pressures are not extremely high, but gaps are very large, strong plastic or composite materials (such as graphite fiber composites) may be used.

Where it is not important to limit the bending stresses of the helical member 111 to the elastic range, the thickness and accommodated gap may be much larger.

With particular reference to FIG. 21 of the drawings, reference numeral 10.11 refers generally to an alternative embodiment of connection apparatus in accordance with this invention for use in forming a high pressure sealed connection between a pipeline section 12.11 and an annular collar (not shown) which is similar to the annular collar 14.1 as shown in FIG. 1.

The apparatus 10.11 corresponds substantially with the apparatus 10.1 as illustrated in FIG. 1. Corresponding parts are therefore indicated by corresponding reference numerals.

The apparatus 10.11 differs from the apparatus 10.1 essentially in the anti-extrusion means 64.11 which is used to prevent axial extrusion of the force transmitting sleeve 58.11.

The mandrel 34.11 has threaded confining rings 42.11 mounted on its opposed ends to define the axially fixed confined zone for registering with the connection zone as discussed with reference to FIG. 1.

The sleeve 58.11 is positioned centrally on the mandrel. Proximate each axial end of the sleeve anti-extrusion means in the form of an anti-extrusion member 64.11 is provided to prevent axial extrusion of the sleeve 58.11 during use.

Each anti-extrusion member 64.11 comprises a helical member 111 which is axially located on the mandrel 34.11 by means of an interchangeable ring 113 which bears against the confining ring 42.11, and displacement means 115 which is associated with the helical member 111 to cause radial outward displacement of the helical member 111 into abutment with the inner surface of the pipe section 12.11 to close the annular gap during use.

The interchangeable rings 113 are interchangeable to provide for adjustability of both the radial and the axial dimensions of these rings. Adjustment of the radial dimension is particularly convenient since this is a simple and effective manner of adjusting the radial dimension of the annular gap between the mandrel 34.11 and the pipe section 12.11.

The displacement means 115 preferably comprises an annular sleeve of resiliently deformable rubber which is loosely associated with the helical member 111 in its inoperative condition. This can be seen more clearly in the detailed views shown in FIG. 22.

The anti-extrusion means 64.11 further includes an annular split shim 117 which is designed to be expanded radially during use to prevent extrusion of the displacement means 115 through the gap formed between the interchangeable ring 113 and the trailing end of the helical member 111 during use. The shim would obviously be arranged with the split diametrically opposed to the area where the gap forms at the trailing end of the helical member 111.

Each anti-extrusion means 64.11 further includes an annular interface ring 119 which is loosely positioned on the mandrel 34.11 between the sleeve 58.11 and the displacement means 115.

The interface ring 119 is replaceable for adjusting the axial and radial dimensions when desired. It provides good support for the sleeve 58.11, and provides a known end condition and boundary condition for displacement of both the sleeve 58.11 and the displacement means 115.

In use, when a fluid under pressure is applied to the internal recess of the sleeve 58.11, the sleeve will commence to expand both axially and radially. Axial expansion of the sleeve will cause axial displacement of the interface rings 119 onto their respective displacement means 115. Because of the association between the helical members 111 and the respective displacement means 115, each displacement means 115 will transmit the force provided by the sleeve 58.11 to the helical members 111 thereby causing them to become axially compressed against the interchangeable rings 113, and thereafter causing them to become radially expanded into engagement with the inner surface of the pipe section 12.11.

With proper design of the helical members 111, they will engage the inner surface of the pipe section 12.11 before any axial extrusion of the displacement means 115 can occur. The displacement means 115 can therefore be positively trapped against any axial displacement, and can in turn confine the sleeve 58.11 to the confining zone to effect the required deformation of the pipe section 12.11.

The anti-extrusion means 64.11 provides a number of advantages. Some of the advantages which can be provided by this helical member 111, are:

(a) it completely and smoothly changes from one diameter to another;
(b) it can completely fill annular extrusion gaps;
(c) it is monolithic in structure and therefore does not require additional control devices to maintain relative positions of multi-part structures;
(d) it is simple to manufacture and low in cost;
(e) it has stable motion characteristics;
(f) it can accommodate diameter differences of up to about 20% without yielding;

(g) it will automatically activate in response to pressure-it does not require additional activation devices;

(h) it will automatically return to original diameter when pressure is released, if so designed;

(i) very high pressures (greater than about 50,000 psi.) may be contained with proper design and material selections;

(j) even with large annular gaps, the device may be used many times before replacement will be necessary;

(k) operation and design are simple. The device should therefore be reliable;

(l) after the device is generally expanded to the mating pipe surface, it will tend to conform to the pipe geometry imperfections in general.

With reference to FIG. 23 of the drawings, reference numeral 130.1 refers generally to apparatus for use in forming an annular seal in a tubular member in the form of a downhole casing 132.1.

The apparatus 130.1 is in the form of a downhole packer. It comprises a mandrel 134.1 which comprises two axially displaceable mandrel sections 136 and 138.

Each mandrel section 136 and 138 has conventional segmented slips 140 mounted thereon. The slips have tapered inner bores which cooperate with tapered surfaces on the mandrel sections. The segmented slips 140 are held in position by annular collars 142.

The mandrel 134.1 has an annular sleeve 158.1 mounted thereon to constitute the annular sealing sleeve for the packer 130.1.

The sleeve 158.1 has a helical member 111 mounted at each axial end thereof.

The mandrel sections 136 and 138 are axially displaceable relatively to each other, and the section 136 includes a protective sleeve 144 to prevent the packer from being able to move radially inwardly into the gap between the two mandrel sections.

In use, the packer 130.1 is inserted into the downhole casing 132.1 and, in conventional manner, the segmented slips 140 of the upper mandrel section 138 are actuated to engage with the inner surface of the casing. Thereafter the lower mandrel section 136 is raised in conventional manner to draw the two sections 136 and 138 axially towards each other and thereby provide an axial compressive force on the sleeve 158.1. This axial compression of the sleeve causes radial expansion of the sleeve. At the same time, it causes radial expansion of the helical members 111 so that they come into abutment with the inner surface of the casing 132.1 thereby sealing the annular gap between the mandrel sections 136 and 138, and the inner surface of the casing 132.1.

Axial compression may be continued until the sleeve 158.1 has provided a desired sealing engagement with the inner surface of the casing 132.1. Thereafter the segmented slips 140 of the lower mandrel section 136 forming a pair of annular seals in a tubular member for use in testing an annular weld 144.

The annular member 132.2 is typically in the form of two pipe sections which have been joined in end-to-end relationship by means of the annular weld 144. The apparatus 130.2 may equally be used for burst testing pipe for quality control or research purposes in the same way.

The apparatus 130.2 is in the form of a pressure isolated device for producing high pressure in an axially isolated zone in the tubular member 132.2.

The apparatus 130.2 includes a mandrel 134.2 which has mounted thereon two axially spaced sealing sleeves 158.2 which are designed to define an axially isolated zone between them during use.

Each sealing sleeve 158.2 is of an appropriate rubber, as herein before described, and has a helical member 111 associated with its axial outer end. The helical member is, in use, designed to close the annular gap between the mandrel 134.2 and the sealing sleeves 158.2 to thereby contain the sealing sleeves and permit them to effectively contain pressure in the isolated zone.

The mandrel 134.2 has two pairs of cooperating annular pistons 146 and 148 mounted thereon.

The mandrel 134.2 has a sealing activation port 150 provided therein for connection to a source of fluid under pressure. The port 150 leads to the annular spaces 152 between the pairs of pistons 146 and 148. When pressure is applied to these annular spaces 152, the pistons 148 will be displaced axially outwardly away from each other to axially compress the sealing sleeves 158.2 against the axial walls of the mandrel 134.2, and thereby cause activation of the helical members 111. In the operative position as shown in the right hand side of FIG. 24, the sealing sleeves 158.2 will have engaged firmly with the inner surfaces of the annular member 132.2 to provide high pressure seals. The helical members 111 prevent axial extrusion and thereby allow effective reuse of the sealaing sleeves 158.2.

The mandrel 134.2 further includes a test pressure port 154 for connection to a source of fluid under pressure. The port 154 leads to the isolated zone between the sealing sleeves 158.2 to allow pressure to be applied for testing the integrity of the weld 144 or the burst strength of a pipe, as may be required.

With reference to FIG. 25 of the drawings, reference numeral 130.3 refers generally to apparatus for use in forming a high pressure seal in a tubular member in the form of a high pressure pump cylinder or extrusion cylinder 132.3.

The apparatus 130.3 is in the form of a high pressure piston device. The piston device comprises a mandrel 134.3 which constitutes the piston of the piston device which is displaceable in the cylinder 132.3.

The piston 134.3 has a sealing sleeve 158.3 mounted thereon. The sealing sleeve is shaped to be expanded by pressure within the cylinder during use, for the sleeve seal 158.3 to extrude through the gap between the piston and the cylinder.

The helical member will therefore restrict such extrusion even under high pressure, and can do so even when the gap between the piston and cylinder increases as a result of wear.

The helical member 111.3 as shown in FIG. 25, has its inner annular surface tapered relatively to its axis to accommodate the tapered configuration of the sealing sleeve 158.3. This provides the additional advantage that the coils of the helical member which are spaced the furthest from the piston 134.3, have a lesser radial dimension, and can therefore be displaced more easily into contact with the inner walls of the cylinder 132.3.

The apparatus 130.3 provides the advantage that an effective high pressure sealing system can be provided which will restrict extrusion of the elastomeric sealing material, and which can accommodate dimension variations during use.

The helical member 111.3 may be of any suitable material such as steel, bronze, brass, etc.

FIGS. 26, 27 and 28 illustrate alternative embodiments of the anti-extrusion means in accordance with this invention. They are generally similar and corresponding features are indicated by corresponding reference numerals.

With reference to FIGS. 26A and 26B of the drawings, reference numeral 12.13 refers generally to a pipe section, whereas reference numeral 10.13 refers generally to apparatus for forming a seal with that pipe section.

The apparatus 10.13 includes a confining ring 42.13, an interchangeable ring 113.13, a helical member 111.13 and displacement means 115.13.

The components which thus constitute the anti-extrusion means 64.13 are generally similar to those illustrated in FIG. 21, except that the interchangeable ring 113.13 has a tapered surface, the helical member 111.13 has two opposed tapered surfaces, and the displacement means 115.13 has complementary tapered surfaces. These tapered surfaces cooperate to provide a wedge action to increase the effective wedging action in the radial direction to radially expand the helical member 115.13 between the relaxed position as shown in FIG. 26A, and the operative engaging position as shown in FIG. 26B to provide an effective anti-extrusion system.

With reference to FIGS. 27A and 27B of the drawings, corresponding parts to those illustrated in FIG. 26 are indicated by corresponding reference numerals, except that the suffix "0.14" has been used instead of the suffix "0.13".

In FIG. 27 of the drawings, the helical member 111.14 is shown having its inner circumferential surface tapered relatively to its axis to provide a gradually changing radial dimension from one end to the opposed axial end of the helical member 111.14. The helical member 111.14 is therefore similar to the helical member 111.3 illustrated in FIG. 25 of the drawings. The displacement means 115.14 has a complementary configuration.

Upon axial compression of the displacement means 115.14 against the interchangeable ring 113.14, the helical member 111.14 will be deformed in a radial outward direction to engage sealingly with the inner walls of the pipe section 112.14. Because of its particular configuration, the helical member can be used even though the annular gap between the interchangeable ring 113.14 and the pipe section 112.14 is larger than the radial thickness of the coils of the helical member 111.14.

With reference to FIGS. 28A and 28B of the drawings, the anti-extrusion means 64.15 differs from the anti-extrusion means 64.14 in that the displacement means 115.15 is a solid conical ring as opposed to the displacement means 115.14 which is of a deformable elastomeric or rubber material.

When the annular sleeve 158.15 is expanded axially and radially, it will displace the displacement means 115.15 which will in turn radially expand the helical member 111.15. The interchangeable ring 113.15 is designed to accommodate the displacement means 115.15.

The helical member 111.15 is shown in FIG. 28A in a relaxed condition and in an operative position in FIG. 28B. In addition, in FIG. 28B, the helical member is shown having annular teeth about its outer periphery to demonstrate how such an embodiment may be utilized to provide a firm gripping engagement with the inner walls of a pipe section 112.15.

FIG. 29 shows a composite helical member 111.16 which has rubber end rings 175 and which has rubber filler 179 molded onto the material of the coils of the member.

I claim:

1. Apparatus for use in forming a connection between an inner tubular member and an outer tubular member when they are axially overlapped to form an axially extending connection zone, the apparatus comprising a connection tool positionable proximate to the connection zone, the connection tool comprising:
   (a) a mandrel;
   (b) axially spaced confining means to define an axially confined zone of the mandrel for registering with the connection zone;
   (c) a force transmitting sleeve of a solid deformable material positioned in the confined zone on the mandrel and having an internal recess for receiving a fluid under pressure;
   (d) anti-extrusion means which is axially proximate the sleeve and displaceable in a radial direction during use into abutment with the adjacent tubular member to limit extrusion of the transmitting sleeve material in an axial direction during use,
   the anti-extrusion means comprising an anti-extrusion member provided at each axial end of the sleeve, each anti-extrusion member comprising a helical member which is axially located relatively to the mandrel, and displacement means which is associated with the helical member to transmit pressure from the sleeve to the helical member to cause radial outward displacement of the helical member into abutment with the inner surface of the inner tubular member to close the annular gap and thus restrict axial extrusion of the sleeve; and
   (e) means for directing a force in the form of a fluid under pressure gradually to the internal recess during use to cause deformation of the sleeve, said anti-extrusion means cooperating to bias the sleeve deformation in a radial direction for engaging with and then causing deformation of the walls of one adjacent tubular member in a radial direction for engaging with the walls of the other tubular member in the connection zone to form a connection between the first and second tubular member,
   the connection tool being adapted to be positioned within the inner tubular member when the tubular members are overlapped, and the force transmitting sleeve being adapted to be deformed in a radial outward direction to engage with the inner surface of the walls of the inner tubular member and then deform these walls radially outwardly into engagement with the walls of the outer tubular member.

2. Apparatus accordingly to claim 1, in which the material of the sleeve is a resiliently deformable material.

3. Apparatus according to claim 1, in which the displacement means comprises a deformable material which is deformable under pressure.

4. Apparatus according to claim 3, in which the helical member comprises a plurality of coils which are of substantially rectangular or square cross-section.

5. Apparatus according to claim 1, in which the force direction means comprises a pressure chamber within the mandrel for connection to a source of fluid under pressure, to apply such a pressurized fluid to the internal recess formed between the mandrel and the force transmitting sleeve.

6. Apparatus according to claim 5, including force generating means for generating a fluid under pressure.

7. Apparatus according to claim 6, in which the force generating means comprises an intensifier pump system.

8. Apparatus according to claim 1, in which the force transmitting sleeve is formed with an internal annular recess bounded by inwardly directed annular zones which are designed to be forced onto the mandrel into sealing engagement therewith when a fluid under pressure is applied to the internal annular recess.

9. Apparatus according to claim 1, including an annular collar to constitute an outer tubular member to be positioned over such an inner tubular member for connection thereto, the annular collar having an annular recess along its internal surface for receiving the walls of such an inner tubular member when expanded by means of the apparatus.

10. Apparatus according to claim 9, in which the annular collar has at least one relief port for the release of fluid from the annular recess.

11. Apparatus according to claim 10, in which the annular collar has a connection flange and the connection tool has a complementary connection flange for removably connecting the connection tool to the annular collar during use of the apparatus.

12. Apparatus for use in restricting extrusion of a deformable material under pressure through an annular gap defined between inner and outer annular surfaces, the apparatus comprising a helical member to be positioned proximate the annular gap in axial location with one of the two annular surfaces, and displacement means associated with the helical member to transmit pressure from such a deformable material to the helical member to cause radial displacement of the helical member into abutment with the other of the two surfaces to close the annular gap.

13. Apparatus according to claim 12, in which the displacement means comprises an annular wedge member which is adapted to be displaced to cause radial displacement of the helical member.

14. Apparatus according to claim 12, in which the displacement means comprises a deformable material which is deformable under pressure.

15. Apparatus according to claim 14, in which the displacement means is integral with the deformable material which is to be contained against extrusion.

16. Apparatus according to claim 12, in which the helical member comprises a plurality of coils which are of substantially rectangular or square cross-section.

17. Apparatus according to claim 12, in which the helical member comprises a plurality of coils, and in which at least one of the inner and outer annular surfaces of the helical member is tapered relatively to its axis.

18. Apparatus according to claim 12, in which the helical member comprises a plurality of coils, and in which successive coils have differing radial thicknesses to provide differing resistances to radial displacement.

19. Apparatus for forming an annular seal in a tubular member, the apparatus comprising a mandrel insertable into such a tubular member, a sealing sleeve of deformable material located on the mandrel, the sealing sleeve being adapted to be expanded into engagement with the inner surface of such a tubular member, and at least one anti-extrusion member for restricting axial extrusion of at least one axial end of the sleeve through the annular gap defined between the mandrel and such a tubular member during use, the anti-extrusion member comprising a helical member which is axially located on the mandrel, and displacement means for transmitting a force from the sealing sleeve when it is expanded to the helical member to cause radial outward displacement of the helical member into abutment with the inner surface of the tubular member to close the annular gap and restrict axial extrusion of the sealing sleeve.

20. Apparatus according to claim 19, which is in the form of a downhole packer for forming an annular seal in a tubular member in the form of a downhole casing, the packer including expansion means for radially expanding the sealing sleeve into engagement with the walls of such downhole casing during use, and including an anti-extrusion member positioned proximate each axial end of the sealing sleeve to restrict axial extrusion thereof.

21. Apparatus according to claim 19, which is in the form of a high pressure piston device for forming an annular seal in a tubular member in the form of a cylinder, in which the mandrel comprises the piston of the piston device, in which the sealing sleeve is shaped to be expanded by pressure within such a cylinder during use to form a seal with the walls of such a cylinder, and in which the anti-extrusion member is positioned to restrict extrusion or deformation of the sleeve into an annular gap between the piston and such a cylinder during use.

22. Apparatus according to claim 19, which is in the form of a pressure isolator device for producing high pressure in an axially isolated zone in a tubular member, in which the mandrel has two axially spaced sealing sleeves to define an axially isolated zone between them during use, in which each sealing sleeve has an anti-extrusion member positioned proximate its end which is remote from the other sealing sleeve, in which the device includes a bore for directing a high pressure fluid to the isolated zone during use, and in which the device has expansion means for radially expanding the sleeves during use to form such axially spaced seals.

23. Apparatus according to claim 22, which is in the form of a hydrostatic testing device.

24. A method of restricting the deformation or extrusion of a deformable material through an annular gap defined between inner and outer annular surfaces, which comprises locating a helical member axially relatively to one of the two annular surfaces proximate the gap, and associating the helical member with the deformable material for deformation of the deformable material under pressure to cause radial displacement of the helical member into abutment with the other of the two surfaces to close the gap.

25. A tool adapted for outwardly biasing a portion of a tube or the like, the tool comprising:
   a mandrel operably receivable in said tube adjacent said portion;
   annular sleeve means positionable on said mandrel in close conformity to said tube portion, said sleeve means having an internal recess for receiving a fluid under pressure and said sleeve means being operable to outwardly deform when pressurized fluid is introduced into said recess;
   means for introducing a fluid under pressure into said recess; and
   anti-extrusion means positioned on said mandrel axially adjacent said sleeve means for preventing more than a small amount of axial deformation of said sleeve when pressurized fluid is introduced into said recess, to channelize the deformation of said sleeve in a radially outward direction to bear against said tube portion, said anti-extrusion means comprising an annular helical member, axial expansion of said sleeve applying torsion to said helical member affecting radial displacement thereof to form a seal between said mandrel and said tube.

26. A tool adapted for outwardly biasing a portion of a tube or the like, the tool comprising:
   a mandrel operably receivable in said tube adjacent said portion;
   annular sleeve means positionable on said mandrel in close conformity to said tube portion, said sleeve means having an internal recess for receiving a fluid under pressure and said sleeve means being operable to outwardly deform when pressurized fluid is introduced into said recess;
   means for introducing a fluid under pressure into said recess; and
   anti-extrusion means positioned on said mandrel axially adjacent said sleeve means for preventing more than a small amount of axial deformation of said sleeve when pressurized fluid is introduced into said recess, to channelize the deformation of said sleeve in a radially outward direction to bear against said tube portion, said anti-extrusion means comprising at least a pair of adjoining wedge members, axial expansion of said sleeve effecting sliding movement of the wedge members relative each other and effective radial displacement to form a seal between said mandrel and said tube.

27. A tool adapted for outwardly biasing a portion of a tube or the like, the tool comprising:
   a mandrel operably receivable in said tube adjacent said portion;
   annular sleeve means positionable on said mandrel in close conformity to said tube portion, said sleeve means having an internal recess for receiving a fluid under pressure and said sleeve means being operable to outwardly deform when pressurized fluid is introduced into said recess;
   means for introducing a fluid under pressure into said recess, said fluid introducing means includes a source of pressurized fluid and a fluid passageway in said mandrel in operable communication with said sleeve recess; and
   anti-extrusion means positioned on said mandrel axially adjacent said sleeve means for preventing more than a small amount of axial deformation of said sleeve when pressurized fluid is introduced into said recess, to channelize the deformation of said sleeve in a radially outward direction to bear against said tube portion.

* * * * *